(12) United States Patent
Huang et al.

(10) Patent No.: US 12,293,163 B1
(45) Date of Patent: May 6, 2025

(54) SPLIT ACCUMULATOR WITH A SHARED ADDER

(71) Applicant: Recogni Inc., San Jose, CA (US)

(72) Inventors: Jian hui Huang, Los Altos, CA (US); Gary S. Goldman, Los Altos, CA (US)

(73) Assignee: Recogni Inc., San Jose, CA (US)

( * ) Notice: Subject to any disclaimer, the term of this patent is extended or adjusted under 35 U.S.C. 154(b) by 0 days.

(21) Appl. No.: 18/679,915

(22) Filed: May 31, 2024

Related U.S. Application Data

(63) Continuation of application No. 18/408,309, filed on Jan. 9, 2024, now Pat. No. 12,026,478, and a continuation of application No. 18/408,296, filed on Jan. 9, 2024, now Pat. No. 12,039,290.

(51) Int. Cl.
  *G06F 7/544* (2006.01)
  *G06F 7/509* (2006.01)

(52) U.S. Cl.
  CPC .......... *G06F 7/5443* (2013.01); *G06F 7/5095* (2013.01)

(58) Field of Classification Search
  CPC .............................. G06F 7/5443; G06F 7/5095
  USPC ......................................................... 708/620
  See application file for complete search history.

(56) References Cited

U.S. PATENT DOCUMENTS

| | | | |
|---|---|---|---|
| 4,866,651 A | 9/1989 | Bleher | |
| 7,424,503 B2 | 9/2008 | Moore | |
| 10,949,736 B2 | 3/2021 | Deisher et al. | |
| 11,275,559 B2 | 3/2022 | Lamb | |
| 11,435,981 B2 | 9/2022 | Kim | |
| 11,693,625 B2 | 7/2023 | Ware | |
| 2008/0232282 A1 | 9/2008 | Tsai | |
| 2011/0238721 A1 | 9/2011 | Xiu | |
| 2024/0020094 A1 | 1/2024 | Yu | |

OTHER PUBLICATIONS

Castaldo; et al., "Reducing Floating Point Error in Dot Product Using the Superblock Family of Algorithms", SIAM Journal on Scientific Computing, 2009, 31(2):1156-1174.
Demmel; et al., "Accurate floating point summation", Computer Science Division Technical Report UCB//CSD-02-1180, May 8, 2002, University of California, Berkeley, 37 pgs.
Graillat, Stef, "Applications of fast and accurate summation in computational geometry", E'quipe de Recherche Dali, Research Report No. RR2005-03, May 16, 2005, 13 pgs.

(Continued)

*Primary Examiner* — Tan V Mai
(74) *Attorney, Agent, or Firm* — Ascenda Law Group, PC

(57) ABSTRACT

In a multiply accumulate (MAC) unit, an accumulator may be implemented in two or more stages. For example, a first accumulator may accumulate products from the multiplier of the MAC unit, and a second accumulator may periodically accumulate the running total of the first accumulator. Each time the first accumulator's running total is accumulated by the second accumulator, the first accumulator may be initialized to begin a new accumulation period. In one embodiment, the number of values accumulated by the first accumulator within an accumulation period may be a user-adjustable parameter. In one embodiment, the bit width of the input of the second accumulator may be greater than the bit width of the output of the first accumulator. In another embodiment, an adder may be shared between the first and second accumulators, and a multiplexor may switch the accumulation operations between the first and second accumulators.

19 Claims, 32 Drawing Sheets

(56) References Cited

OTHER PUBLICATIONS

He; et al., "Group-Alignment based Accurate Floating-Point Summation on FPGAs", International Conference on Engineering of Reconfigurable Systems and Algorithms, 2006, 7 pgs.
Higham; Nicholas J., "The Accuracy of Floating Point Summation", Siam Journal on Scientific Computing, Jul. 1993, 14(4):783-799.
Lange, Marko, "Towards accurate and fast summation", ACM Transactions on Mathematical Software, Sep. 10, 2022, 39 pgs.
Malcolm, Michael, "An Algorithm for Floating-Point Accumulation of Sums With Small Relative Error", Stanford Univ CA Dept of Computer Science, Jun. 1, 1970, AD0708691, 25 pgs.
Malcolm, Michael A., "On Accurate Floating-Point Summation", Communications of the ACM, Nov. 1971, 14(11):731-736.
Ross, D.R., "Reducing Truncation Errors Using Cascading Accumulators", Coomunications of the ACM, Jan. 1965, 8(1):32-33.
Wolfe, Jack M., "Reducing Truncation Errors by Programming", Communications of the ACM, Jun. 1964, 7(6):355-356.
Notice of Allowance mailed Apr. 3, 2024, for U.S. Appl. No. 18/408,296, (filed Jan. 9, 2024), 14 pgs.
Notice of Allowance mailed Mar. 18, 2024, for U.S. Appl. No. 18/408,309, (filed Jan. 9, 2024), 8 pgs.

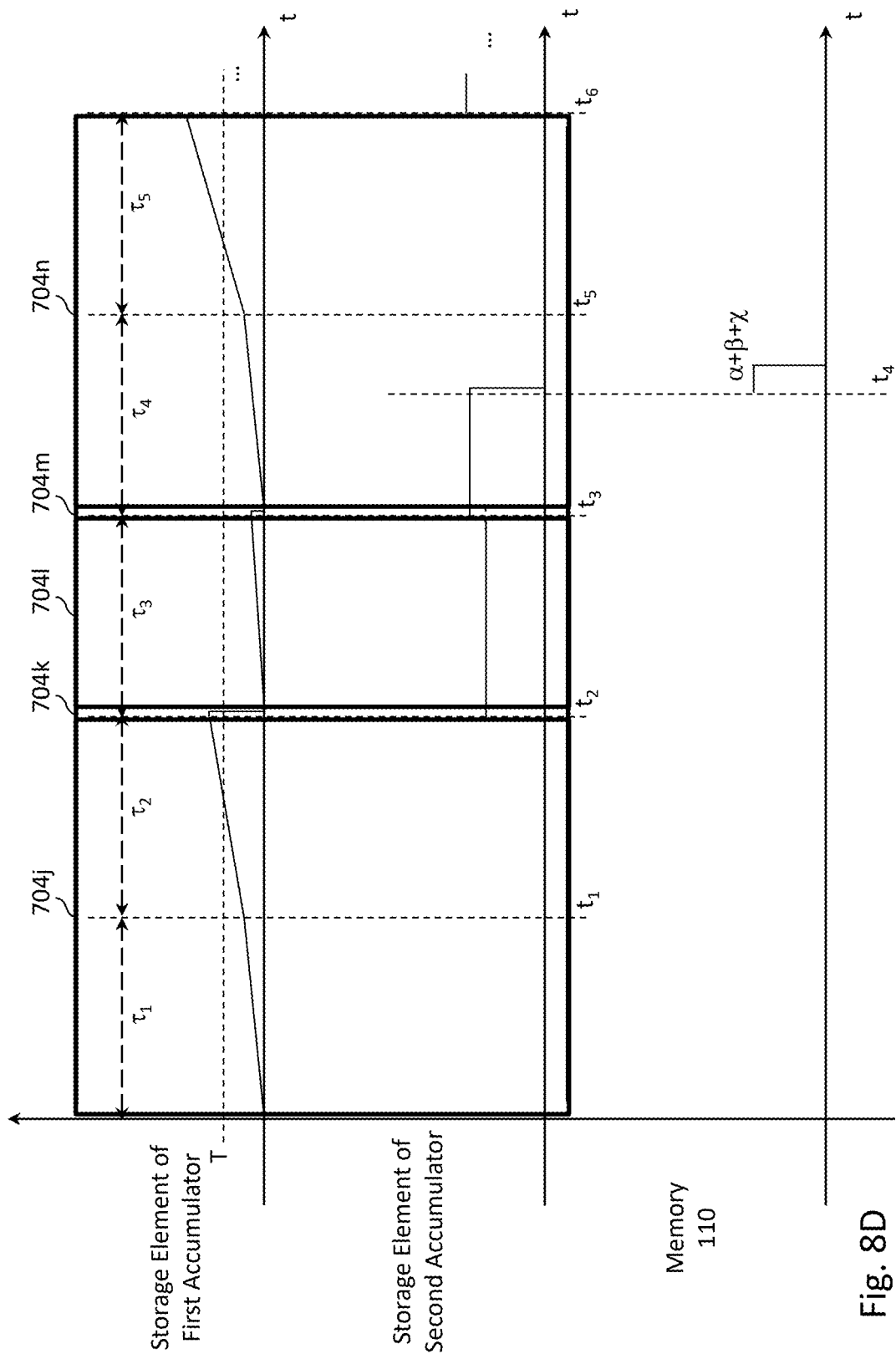

SPLIT ACCUMULATOR WITH A SHARED ADDER

RELATED APPLICATIONS

This application is a Continuation Application of U.S. application Ser. No. 18/408,296, filed on 9 Jan. 2024 (now issued as U.S. Pat. No. 12,039,290), and is a Continuation Application of U.S. application Ser. No. 18/408,309 (now issued as U.S. Pat. No. 12,026,478), filed on 9 Jan. 2024, both of which are incorporated by reference herein.

FIELD OF THE INVENTION

The present invention relates to a multiply accumulate (MAC) unit with a split accumulator, and more specifically relates to a split accumulator with two or more stages of accumulators.

BACKGROUND

A fundamental computing structure for neural networks is a multiply accumulate (MAC) unit, which includes a multiplier for multiplying two values and an accumulator for accumulating the output of the multiplier. For example, a MAC unit may be used to compute a dot product for a convolution operation by serially accumulating the pairwise products of the respective elements of two vectors. The description hereinbelow addresses potential bandwidth constraints when one memory is tasked with reading the output from numerous MAC units, and further discusses power efficient architectures for individual MAC units.

SUMMARY OF THE INVENTION

In accordance with one embodiment of the invention, the accumulator in a MAC unit may be implemented using two or more stages of accumulators. For example, a first accumulator may accumulate products from the multiplier of the MAC unit, and a second accumulator may periodically accumulate the running total maintained by the first accumulator. Each time the first accumulator's running total is accumulated by the second accumulator, the first accumulator may be initialized to begin a new accumulation period. A storage element of the second accumulator may also serve as a buffer for the MAC unit in order to decouple the memory bandwidth from the operation of the first accumulator.

In one embodiment, an adder may be shared between the first and second accumulators, and a multiplexor may be employed to switch the accumulation operations back and forth between the first and second accumulators. More specifically, a device may include a multiplier configured to multiply a first value and a second value; an adder configured to sum a third value and a fourth value; a first accumulator configured to accumulate an output of the multiplier; a second accumulator configured to accumulate an output of the first accumulator; and a first multiplexor configured to select one of the output of the multiplier or an output of the second accumulator. Further, a method may include multiplying by a multiplier a first value and a second value; summing by an adder a third value and a fourth value; accumulating by a first accumulator an output of the multiplier; accumulating by a second accumulator an output of the first accumulator; and selecting by a first multiplexor one of the output of the multiplier or an output of the second accumulator. The first accumulator may include the adder and a first storage element, and the second accumulator may include the same adder as the first accumulator and a second storage element. In one embodiment, the third value may be set equal to an output of the first multiplexor. In one embodiment, the fourth value may be set equal to the output of the first accumulator. In one embodiment, the device may further include a controller to control the first accumulator and the second accumulator so that at most one of the first or second accumulators is performing an accumulation operation. In one embodiment, the device may further include a memory element configured to store the output of the second accumulator. In one embodiment, the device may form a multiply-accumulate (MAC) unit. In one embodiment, the first multiplexor may be configured to select the output of the multiplier when the first accumulator is accumulating the output of the multiplier. In one embodiment, the first multiplexor may be configured to select the output of the second accumulator when the second accumulator is accumulating the output of the first accumulator. In one embodiment, the device may further include a third accumulator configured to accumulate the output of the second accumulator, the third accumulator comprising the adder and a third storage element; and a second multiplexor configured to select one of the output of the first accumulator or an output of the third accumulator. The third value may be set equal to an output of the first multiplexor, and the fourth value may be set equal to an output of the second multiplexor.

In one embodiment, the operation of the MAC unit may be configured by a user-adjustable parameter, $\theta$. More specifically, a device may include a multiplier; a first accumulator configured to accumulate values, wherein the values each comprise a product generated by the multiplier; and a second accumulator configured to accumulate an output of the first accumulator. The device may further include a controller configured to initialize the first accumulator; after the first accumulator has been initialized, instruct the first accumulator to accumulate the values; and instruct the second accumulator to accumulate the output of the first accumulator. Further, a method for operating a device with a first and second accumulator may include initializing the first accumulator; after the first accumulator has been initialized, accumulating values by the first accumulator, in which the values each comprise a product generated by a multiplier; and accumulating by the second accumulator an output of the first accumulator. A total number of the values that are accumulated by the first accumulator between the initialization of the first accumulator and the accumulation of the output of the first accumulator by the second accumulator may be a user-adjustable parameter, $\theta$.

In another embodiment, the bit width of the second accumulator may be greater than the bit width of the first accumulator in order to accommodate a greater dynamic range at the second accumulator. More specifically, a device may include a multiplier, a first accumulator configured to accumulate an output of the multiplier, and a second accumulator configured to accumulate an output of the first accumulator. Further, a method may include accumulating by a first accumulator an output of the multiplier, and accumulating by a second accumulator an output of the first accumulator. A floating point output of the first accumulator may include a first exponent, $e_1$, and a first mantissa, $m_1$. A floating point output of the second accumulator may include a second exponent, $e_2$, and a second mantissa, $m_2$. A bit width, $m\_bw_2$, of a portion of a storage element of the second accumulator that is allocated for storing the second mantissa, $m_2$, may be greater than a bit width, $m\_bw_1$, of a portion of a storage element of the first accumulator that is allocated for storing the first mantissa, $m_1$.

In another embodiment, the bit width of the second accumulator may be greater than the bit width of the first accumulator in order to accommodate a greater dynamic range at the second accumulator. More specifically, a device may include a multiplier configured to multiply two values; a first accumulator (e.g., the first accumulator) configured to accumulate an output of the multiplier; and a second accumulator (e.g., the second accumulator) configured to accumulate an output of the first accumulator. Further, a method may include multiplying by a multiplier two values; accumulating by a first accumulator an output of the multiplier; and accumulating by a second accumulator an output of the first accumulator. A bit width of the input of the second accumulator may be greater than a bit width of the output of the first accumulator. In one embodiment, the device may further include a controller configured to control the first accumulator and the second accumulator so that at any moment in time at most one of the first or second accumulators is performing an accumulation operation. In one embodiment, the device may further include a controller configured to initialize the first accumulator immediately after the output of the first accumulator has been accumulated by the second accumulator. In one embodiment, the first accumulator may include an adder and the controller may be configured to initialize the first accumulator by setting an input of the adder to a zero value. In one embodiment, the first accumulator may include a storage element and the controller may be configured to initialize the first accumulator by storing a zero value in the storage element. In one embodiment, the controller may be configured to initialize the second accumulator immediately after an output of the second accumulator has been written to a memory. In one embodiment, the second accumulator may include an adder and the controller may be configured to initialize the second accumulator by setting an input of the adder to a zero value. In one embodiment, the second accumulator may include a storage element and the controller may be configured to initialize the second accumulator by storing a zero value in the storage element. In one embodiment, the first accumulator may include a first adder, and the second accumulator may include a second adder, and a bit width of the second adder may be greater than a bit width of the first adder. In one embodiment, the device may further include a third accumulator configured to accumulate an output of the second accumulator. A bit width of an input of the third accumulator may be greater than a bit width of the output of the second accumulator.

These and other embodiments of the invention are more fully described in association with the drawings below.

BRIEF DESCRIPTION OF THE DRAWINGS

FIG. 2I depicts a variation of the system depicted in FIG. 2C for accumulating signed floating point numbers with an exponent bias, in accordance with one embodiment of the invention.

FIG. 8D depicts time windows (overlaid on top of FIG. 8C) showing the accumulation operation alternating between the first and second accumulators, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1A:
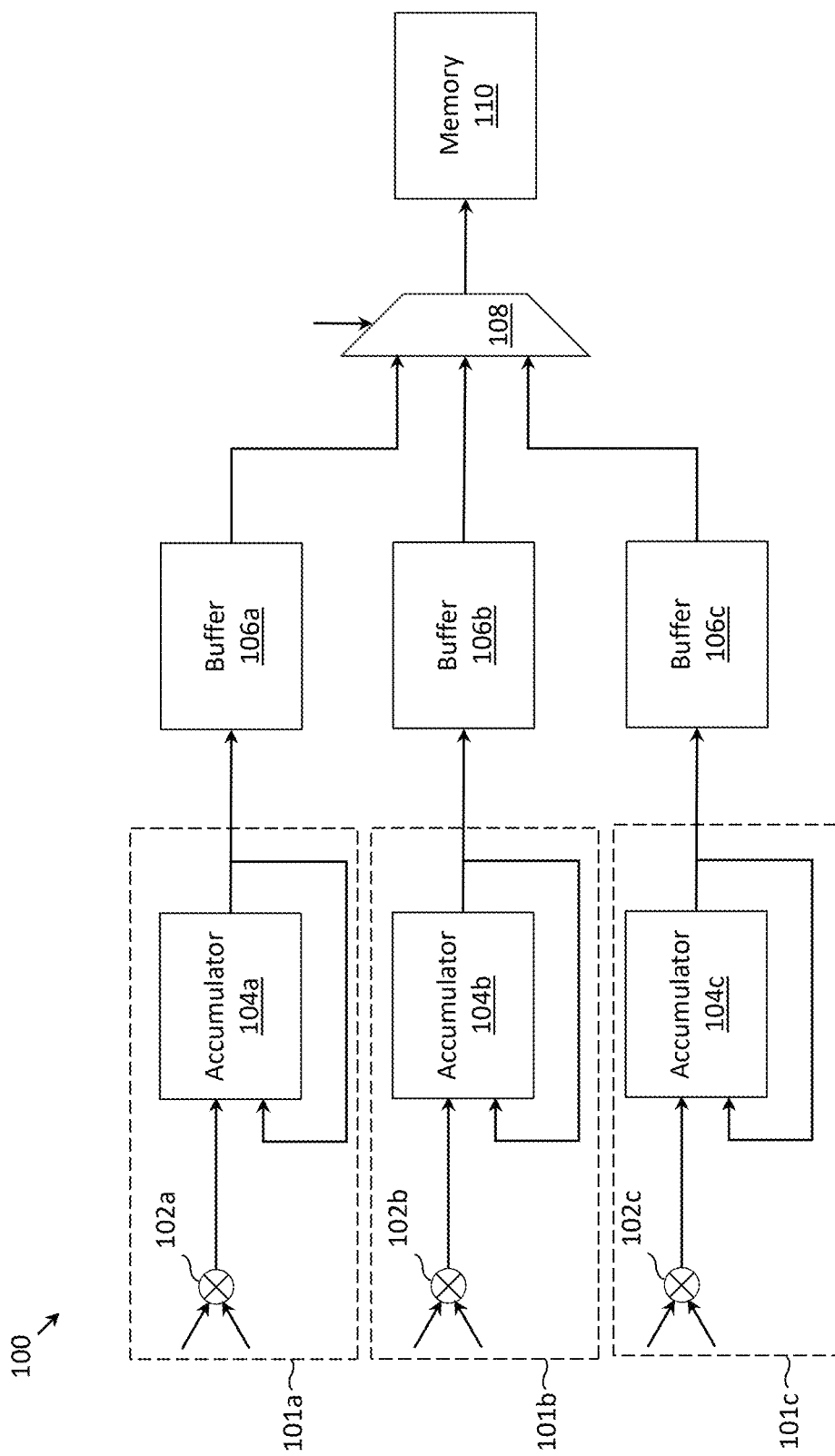
FIG. 1A depicts a system with a buffered bank of multiply accumulate (MAC) units that are communicatively coupled to a memory via a selector circuit (e.g., a multiplexor).

FIG. 1A depicts a system 100 with a plurality of multiply accumulate (MAC) units 101a, 101b, 101c that are communicatively coupled to a memory 110 via a selector circuit (e.g., a multiplexor 108). While three MAC units have been depicted, it is understood that system 100 may in general include two or more MAC units. The output of each of the MAC units may be temporarily stored in buffers 106a, 106b, 106c, allowing the MAC units to begin the computation of a new value while the previously computed value waits its turn to be stored to memory 110. MAC unit 101a may include a two-input multiplier 102a whose output is accumulated by accumulator 104a; MAC unit 101b may include a two-input multiplier 102b whose output is accumulated by accumulator 104b; and MAC unit 101c may include a two-input multiplier 102c whose output is accumulated by accumulator 104c.

Figure 1B:
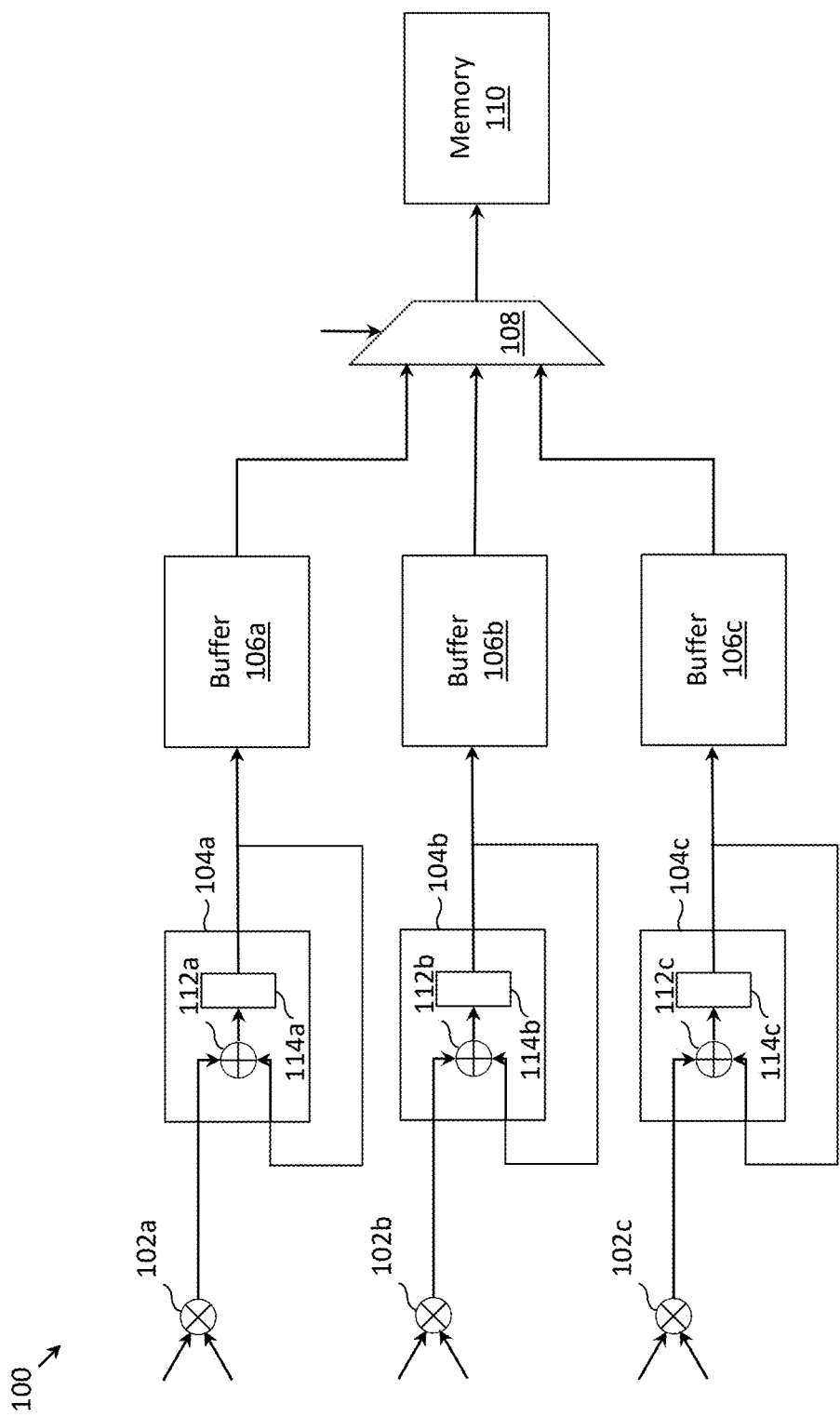
FIG. 1B depicts the internal details of each of the accumulators depicted in FIG. 1A.

FIG. 1B depicts the internal details of each of the accumulators depicted in FIG. 1A. Specifically:

Accumulator 104a may include two-input adder 112a and storage element 114a.

Accumulator 104b may include two-input adder 112b and storage element 114b.

Accumulator 104c may include two-input adder 112c and storage element 114c.

The output of each of the two-input adders may be stored in the corresponding storage element.

Figure 2A:
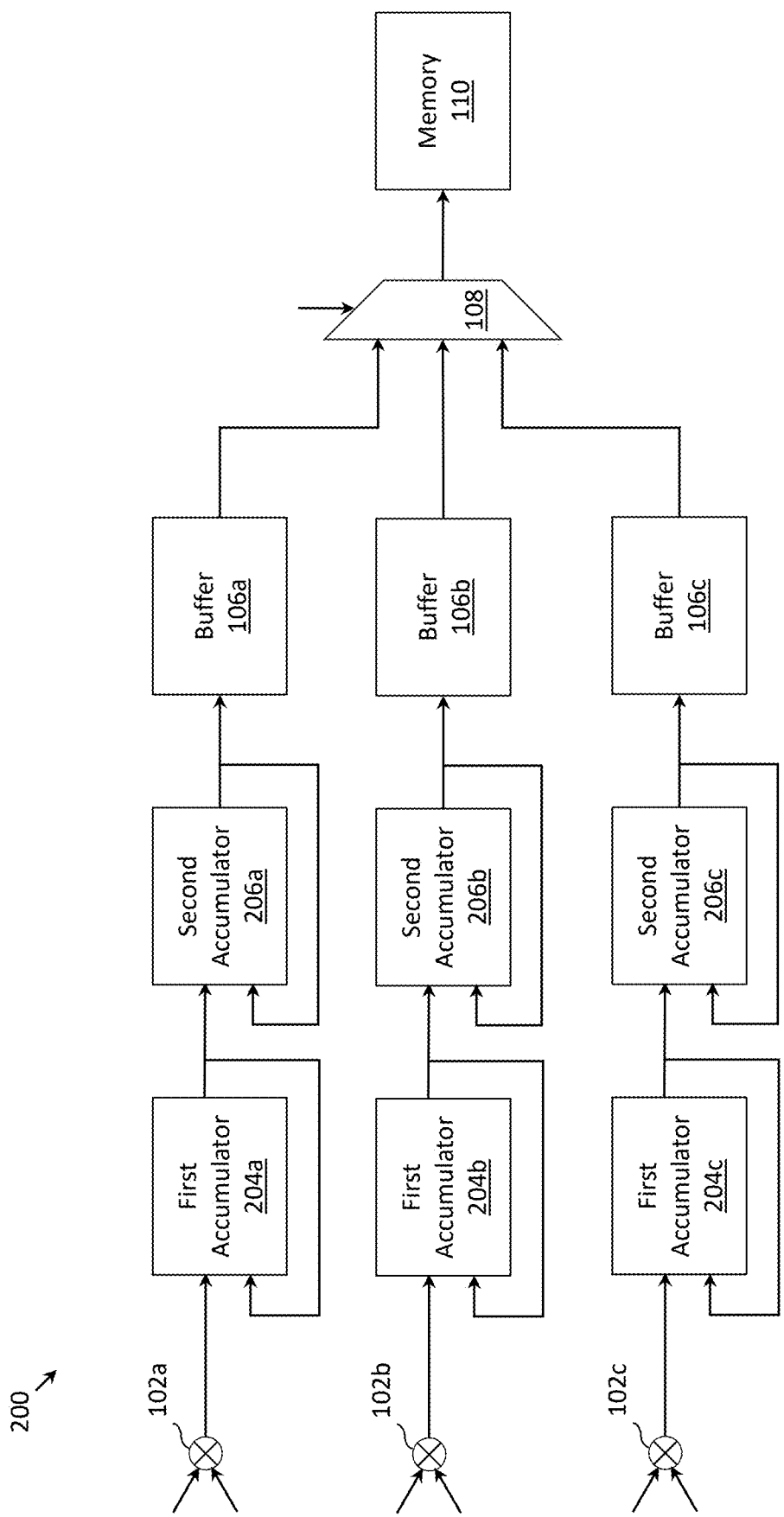
FIG. 2A depicts a variation of the system depicted in FIG. 1 in which each of the MAC units comprises two stages of accumulators (e.g., a first accumulator and a second accumulator), in accordance with one embodiment of the invention.

FIG. 2A depicts system 200, a variation of system 100 depicted in FIG. 1, in which each of the MAC units comprises two stages of accumulators (i.e., a first accumulator that is serially connected to a second accumulator). Specifically, when comparing FIGS. 1A and 2A, the following is apparent:

Accumulator 104a has been replaced by first accumulator 204a and second accumulator 206a.

Accumulator 104b has been replaced by first accumulator 204b and second accumulator 206b.

Accumulator 104c has been replaced by first accumulator 204c and second accumulator 206c.

Generally, the operation of the first and second accumulators proceeds as follows: First, the first and second accumulators are initialized (later figures will provide specific means to carry out the initialization). Next, the first accumulator accumulates products from the multiplier for a predefined time period, a predefined number of clock cycles, a predefined number of accumulation, or until a predetermined threshold value is crossed. At this point, the second accumulator accumulates the running total of the first accumulator, and the first accumulator is re-initialized. The first accumulator resumes its accumulation of products from the multiplier and the same routine as was just described is repeated (less the initialization of the second accumulator) until all of the products from the multiplier (corresponding to one dot product) have been accumulated by the combined operations of the first accumulator and the second accumulator.

An advantage of using two stages of accumulators is that the bit width of the first accumulators 204a, 204b, 204c can be reduced as compared to accumulators 104a, 104b, 104c from system 100, since the first accumulators are configured to only accumulate values in a more limited dynamic range. On the other hand, the bit width of the second accumulators 206a, 206b, 206c may not be any different than the bit width of the accumulators 104a, 104b, 104c from system 100, but an advantage is that the overall power consumption of system 200 will be reduced as compared to system 100 because most of the time, the accumulation will be performed by the first accumulators 204a, 204b, 204c, which consume less power than the second accumulators 206a, 206b, 206c. If viewed as a black box and looking from outside the black box, the split-accumulator circuit with two stages of accumulators can accommodate the wider bit width of the second accumulators 206a, 206b, 206c, while consuming an amount of power approximately equal to that of the first accumulators 204a, 204b, 204c, thus having the "best of both worlds."

Figure 2B:
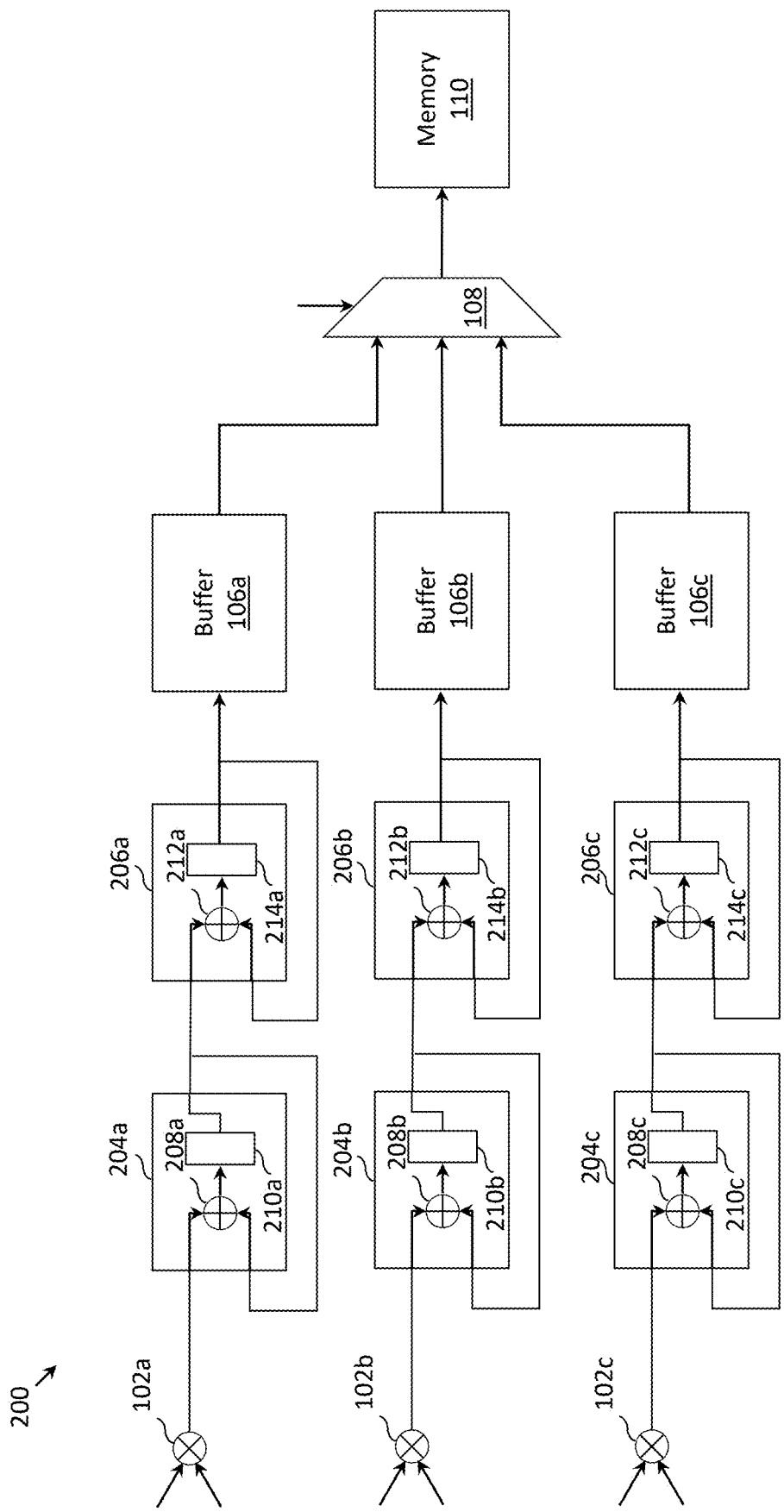
FIG. 2B depicts the internal details of each of the first accumulators and second accumulators depicted in FIG. 2A, in accordance with one embodiment of the invention.

FIG. 2B depicts the internal details of each of the first accumulators and second accumulators depicted in FIG. 2A. Specifically:

First accumulator 204a may include two-input adder 208a and storage element 210a.

Second accumulator 206a may include two-input adder 212a and storage element 214a.

First accumulator 204b may include two-input adder 208b and storage element 210b.

Second accumulator 206b may include two-input adder 212b and storage element 214b.

First accumulator 204c may include two-input adder 208c and storage element 210c.

Second accumulator 206c may include two-input adder 212c and storage element 214c.

The output of each of the two-input adders may be stored in the corresponding storage element.

Figure 2C:
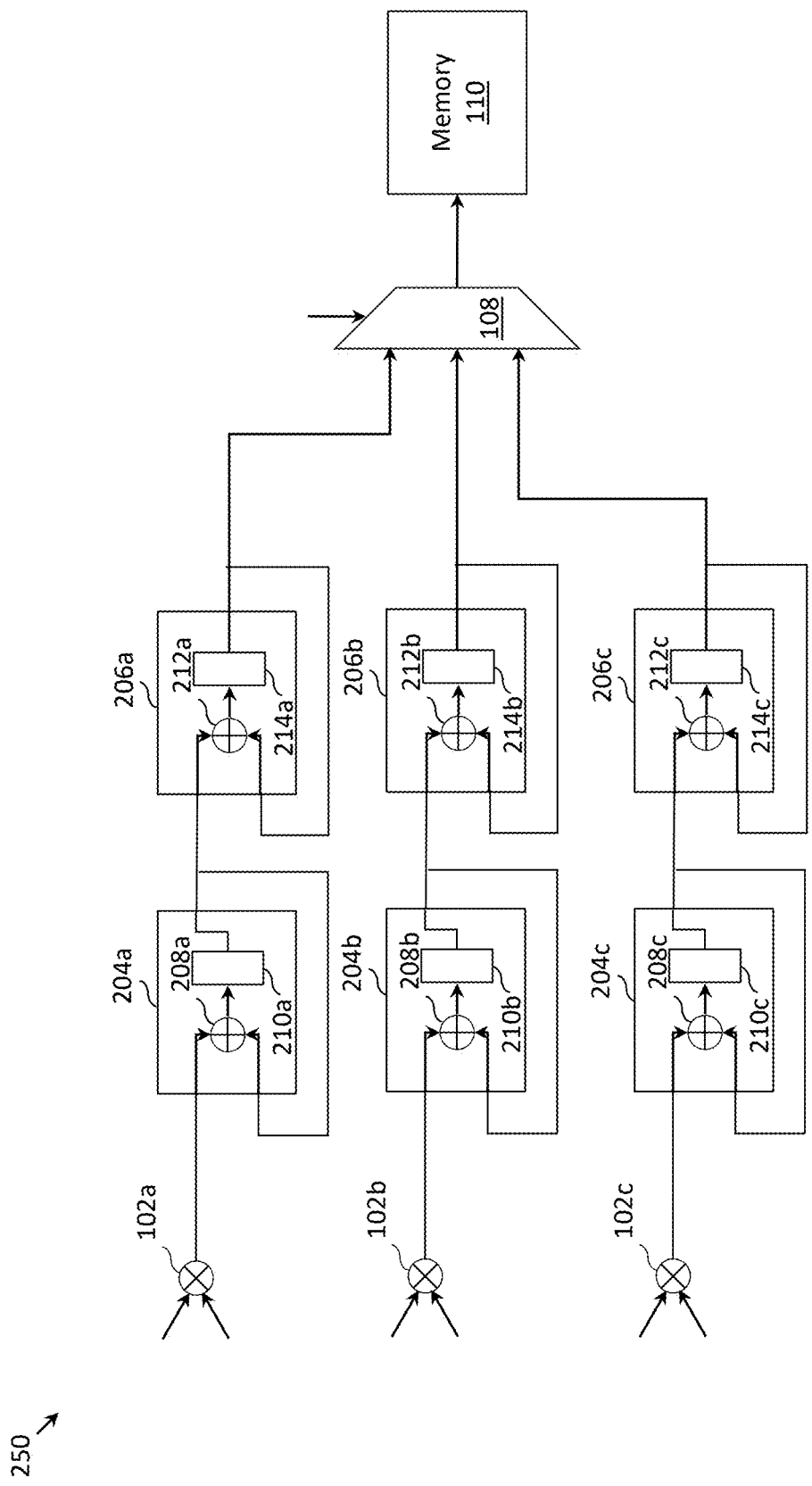
FIG. 2C depicts a variation of the system depicted in FIG. 2B, in which the storage element for each of the second accumulators also serves as the buffer for each of the MAC units, in accordance with one embodiment of the invention.

FIG. 2C depicts system 250, a variation of system 200 depicted in FIG. 2B, in which the storage element of each of the second accumulators also serves as the buffer for each of the MAC units. Specifically:

Storage element 214a may serve in place of buffer 106a.
Storage element 214b may serve in place of buffer 106b.
Storage element 214c may serve in place of buffer 106c.

An advantage of having the respective storage elements of the second accumulators serve as the buffer for each of the MAC units is a reduction in the number of components for the system, which decreases the overcall circuit area.

Figure 2D:
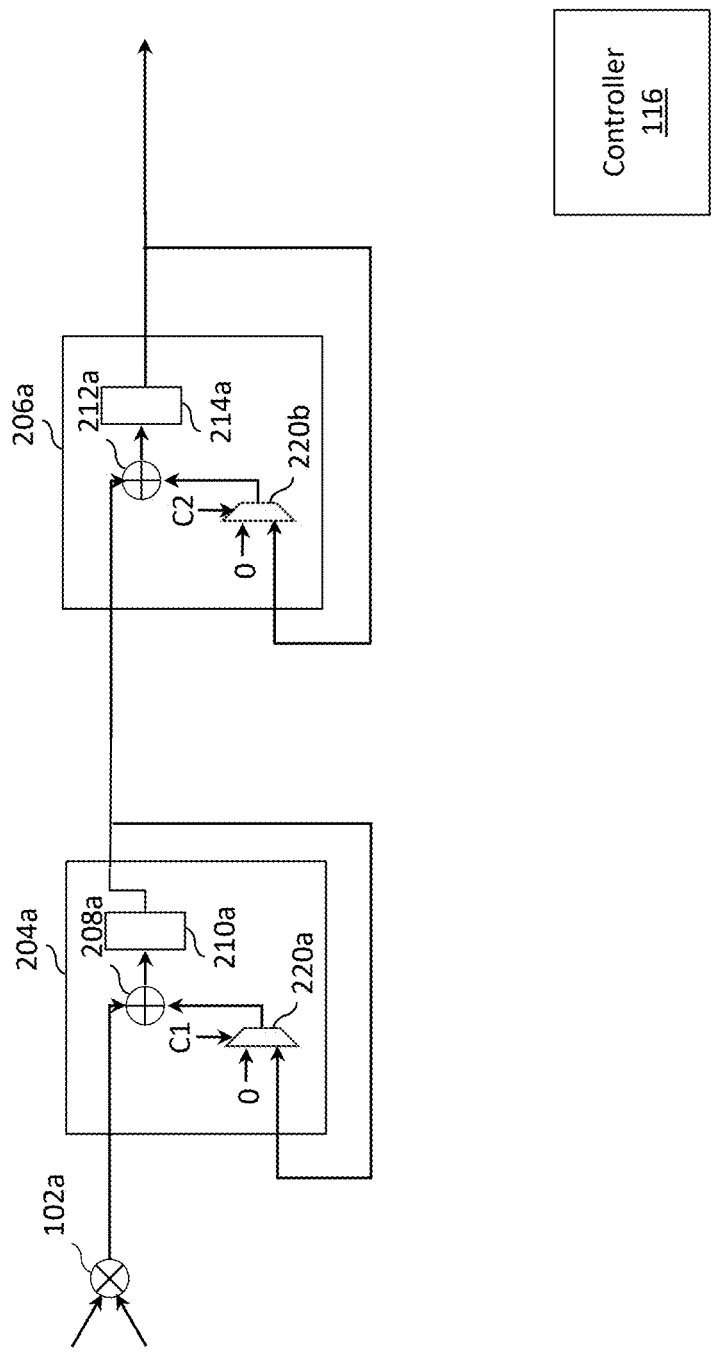
FIG. 2D depicts additional details (e.g., control logic) for initializing the first and second accumulators, in accordance with one embodiment of the invention.

FIG. 2D depicts additional details (e.g., control logic) for initializing the first accumulator 204a and second accumulator 206a. The first accumulator 204a may be initialized by forcing the value in the feedback loop to be a zero value (i.e., more specifically, by using multiplexor 220a to select the zero value in one of its respective inputs). Due to this initialization action, the value stored at storage element 210a will be equal to the product provided by the multiplier 102a, and in effect, the previous running total stored at storage element 210a will be cleared. Similarly, the second accumulator 206a may be initialized by forcing the value in the feedback loop to be a zero value (i.e., more specifically, by using multiplexor 220b to select the zero value in one of its respective inputs). Due to this initialization action, the value stored at storage element 214a will be set equal to the output of first accumulator 204a, and in effect, the previous running total stored at storage element 214a will be cleared. Multiplexors 220a and 220b may be controlled by control signals C1 and C2, respectively, both provided by controller 116. For simplicity of depiction, the signal paths connecting controller 116 with the control signals C1 and C2 have been omitted. As should be understood, the approach for initializing the first accumulator 204a and second accumulator 206a depicted in FIG. 2D is not limited to only the two accumulators depicted in FIG. 2D, but may be applied to any of the first and second accumulators that are arranged in two stages.

It is noted that a pipelined operation may be employed for the first and second accumulators 204a, 206a. More specifically, in one clock cycle, control signal C1 may select the top input (i.e., "0" value) and control signal C2 may select the bottom input (i.e., the feedback path), causing the second accumulator 206a to accumulate the output of the first accumulator 204a, while the first accumulator 204a stores the first product (i.e., in a sum of products) from multiplier 102a into storage element 210a.

Figure 2E:
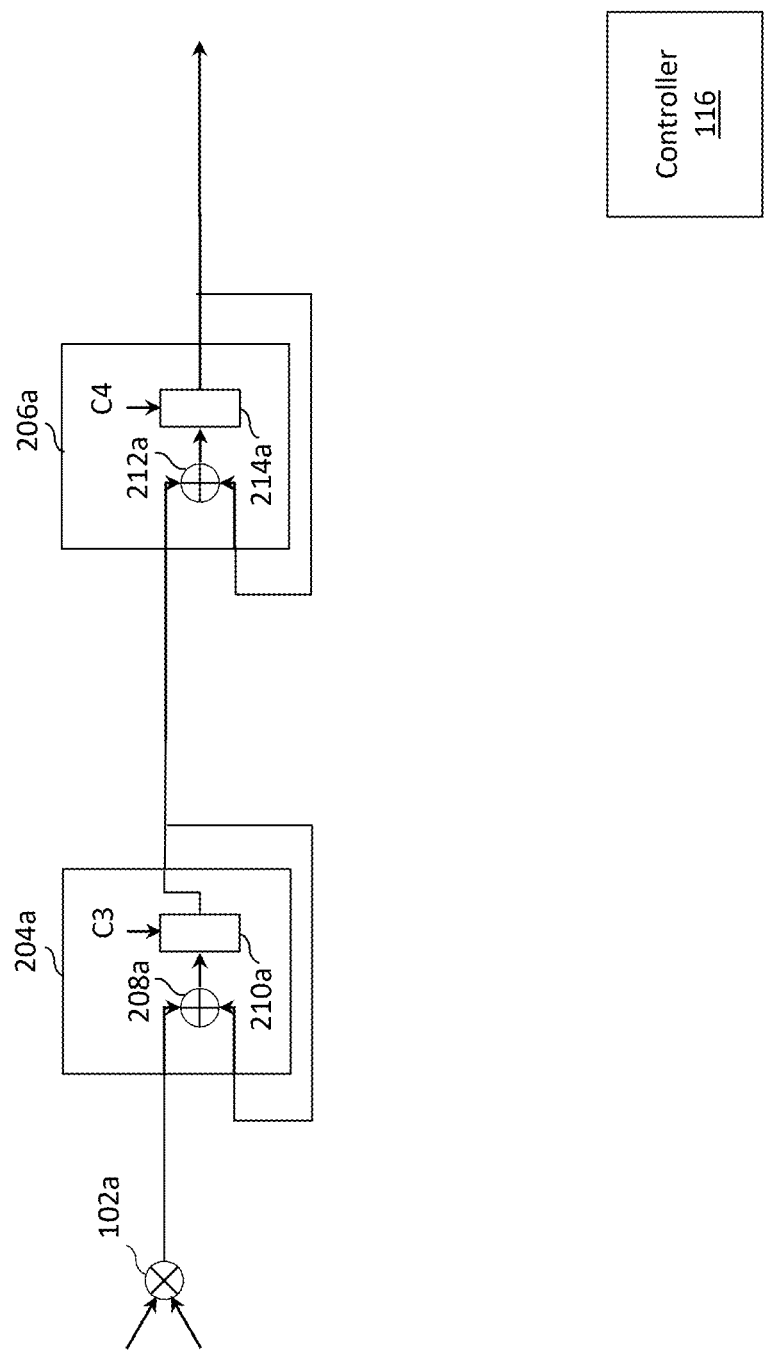
FIG. 2E depicts another approach for initializing the first and second accumulators, in accordance with one embodiment of the invention.

FIG. 2E depicts another approach for initializing the first accumulator 204a and second accumulator 206a. In the embodiment of FIG. 2E, storage element 210a may have a reset input controlled by control signal C3, which upon being toggled by controller 116, causes the value at the storage element 210a to be set to a zero value. Similarly, storage element 214a may have a reset input controlled by control signal C4, which upon being toggled by controller 116, causes the value at the storage element 214a to be set to a zero value. For simplicity of depiction, the signal paths connecting controller 116 with the control signals C3 and C4 have been omitted. As should be understood, the approach for initializing the first accumulator 204a and second accumulator 206a depicted in FIG. 2E is not limited to only the two accumulators depicted in FIG. 2E, but may be applied to any of the first and second accumulators that are arranged in two stages.

Figure 2F:
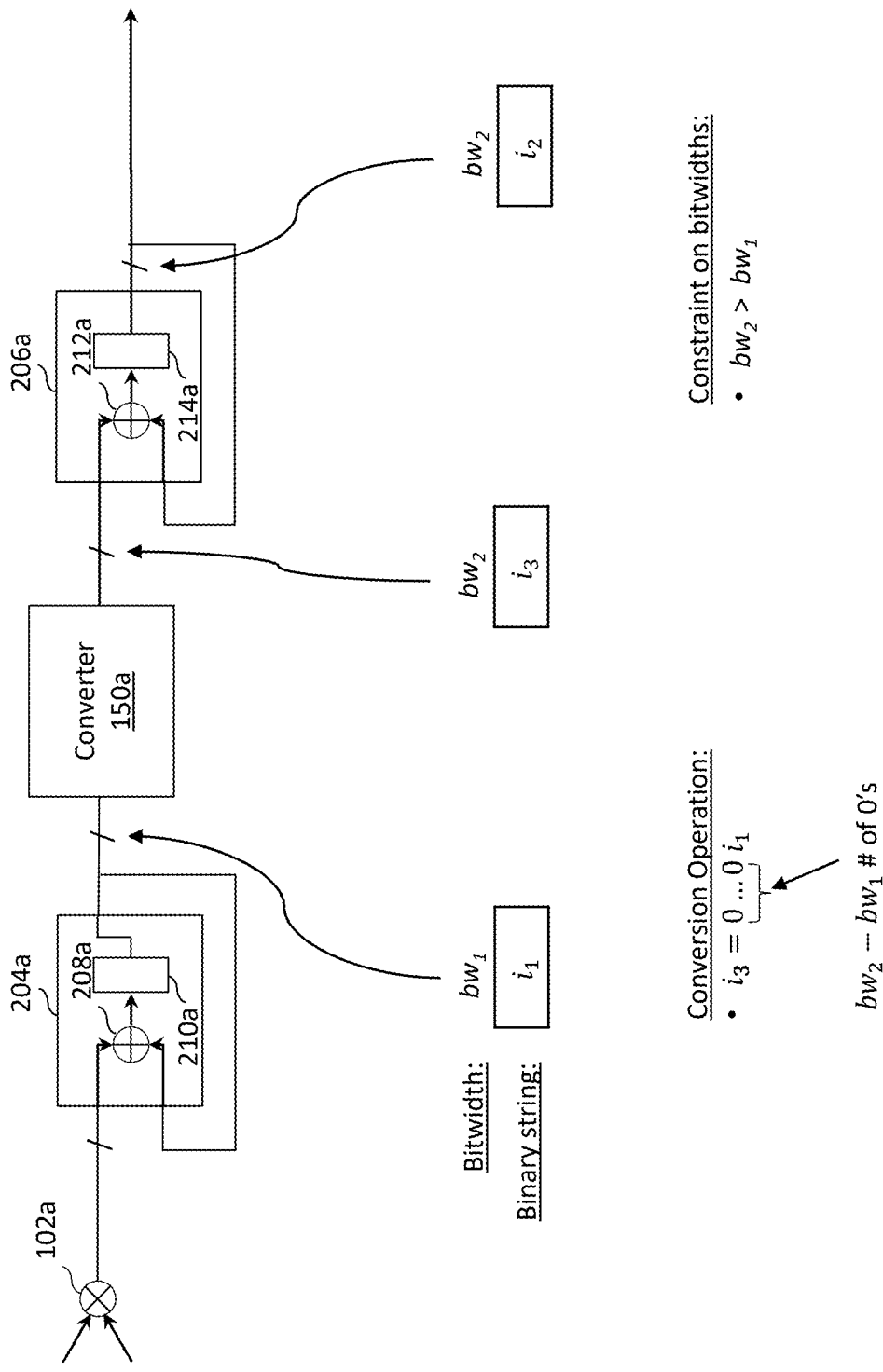
FIG. 2F depicts a variation of the system depicted in FIG. 2C for accumulating integers, in accordance with one embodiment of the invention.

FIG. 2F depicts a variation of the system depicted in FIG. 2C for accumulating integers (i.e., each represented as a string of binary numbers). In the embodiment of FIG. 2F, the bit width, $bw_2$, of the input of the second accumulator 206a (which may be equivalent to the bit width of adder 212a and storage element 214a) may be greater than the bit width, $bw_1$, of the output of the first accumulator 204a (which may be equivalent to the bit width of adder 208a and storage element 210a). This choice of the respective bit widths (i.e., $bw_2 > bw_1$) allows the dynamic range of the second accumulator 206a to be greater than the dynamic range of the first accumulator 204a. In order to match the bit width, $bw_2$, of the input, $i_3$, of the second accumulator 206a, the output, $i_1$, of the first accumulator 204a may be left padded by converter 150a with $bw_2 - bw_1$ number of zeros. The output, $i_2$, of the second accumulator 206a may also have a bit width of $bw_2$ so that adder 212a sums two integers, each having a bit width of $bw_2$. While not depicted, it should be understood that the details of FIG. 2F may apply to one or more branches of the system 250 depicted in FIG. 2C.

Figure 2G:
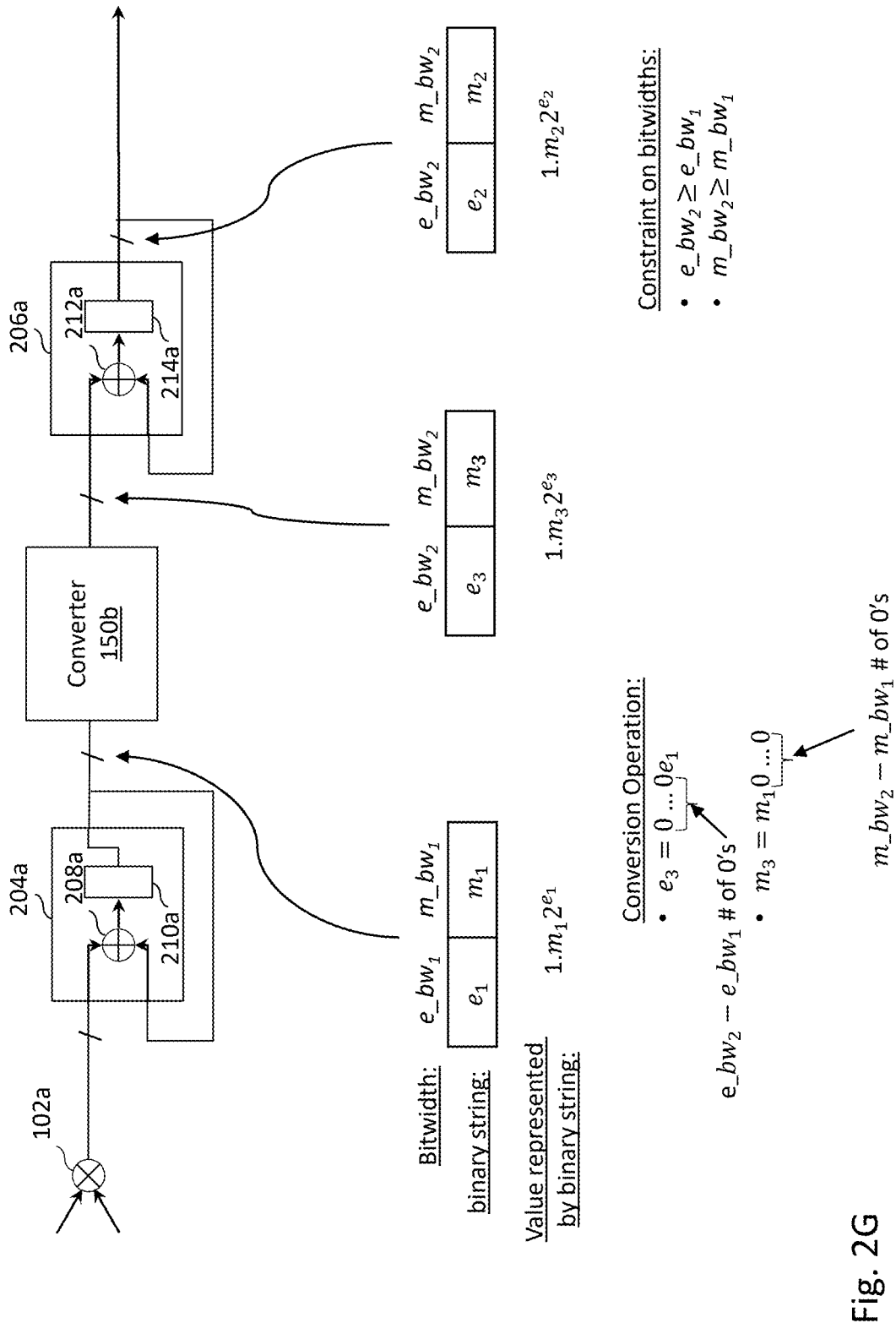
FIG. 2G depicts a variation of the system depicted in FIG. 2C for accumulating unsigned floating point numbers, in accordance with one embodiment of the invention.

FIG. 2G depicts a variation of the system depicted in FIG. 2C for accumulating unsigned floating point numbers. The output of the first accumulator 204a may equal $1 \cdot m_1 2^{e_1}$, in which the "." represents a binary point, $m_1$ represents a first mantissa with a bit width of $m\_bw_1$, and $e_1$ represents a first exponent with a bit width of $e\_bw_1$. The output of the second accumulator 206a may equal $1 \cdot m_2 2^{e_2}$, in which the "." represents a binary point, $m_2$ represents a second mantissa with a bit width of $m\_bw_2$, and $e_2$ represents a second exponent with a bit width of $e\_bw_2$. The input of the second accumulator 206a may equal $1 \cdot m_3 2^{e_3}$, in which the "." represents a binary point, $m_3$ represents a third mantissa with a bit width of $m\_bw_2$, and $e_3$ represents a third exponent with a bit width of $e\_bw_2$.

In the embodiment of FIG. 2G, a bit width, $m\_bw_2$, of a portion of storage element 214a of the second accumulator 206a that is allocated for storing the second mantissa, $m_2$, may be strictly greater than (or greater than or equal to) a bit width, $m\_bw_1$, of a portion of storage element 210a of the first accumulator 204a that is allocated for storing the first mantissa, $m_1$. This choice of the respective mantissa bit widths (i.e., $m\_bw_2 \leq m\_bw_1$) allows the precision of the second accumulator 206a to be greater than or equal to the precision of the first accumulator 204a. Further, a bit width, $e\_bw_2$, of a portion of storage element 214a of the second accumulator 206a that is allocated for storing the second exponent, $e_2$, may be strictly greater than (or greater than or equal to) a bit width, $e\_bw_1$, of a portion of storage element 210a of the first accumulator 204a that is allocated for storing the first exponent, $e_1$. This choice of the respective exponent bit widths (i.e., $e\_bw_2 \geq e\_bw_1$) allows the dynamic range of the second accumulator 206a to be greater than or equal to the dynamic range of the first accumulator 204a.

In order to match the bit width, $e\_bw_2$, of the third exponent, $e_3$, that is provided to the second accumulator 206a, the first exponent, $e_1$, provided by the first accumulator 204a may be left padded by converter 150b with $e\_bw_2 - e\_bw_1$ number of zeros. In order to match the bit width, $m\_bw_2$, of the third mantissa, $m_3$, that is provided to the second accumulator 206a, the first mantissa, $m_1$, provided by the first accumulator 204a may be right padded by converter 150b with $m\_bw_2 - m\_bw_1$ number of zeros. While not depicted, it should be understood that the details of FIG. 2G may apply to one or more branches of the system 250 depicted in FIG. 2C. Further, it is noted that the order in which the exponent and mantissa are arranged in a bit string is not a critical detail. While the example in FIG. 2H had the exponent arranged before the mantissa, the mantissa could be arranged after the exponent in another embodiment. There is also no requirement for the exponent and mantissa to be concatenated into a single bit string. In another embodiment, the exponent and mantissa could be represented using two separate bit strings.

Figure 2H:
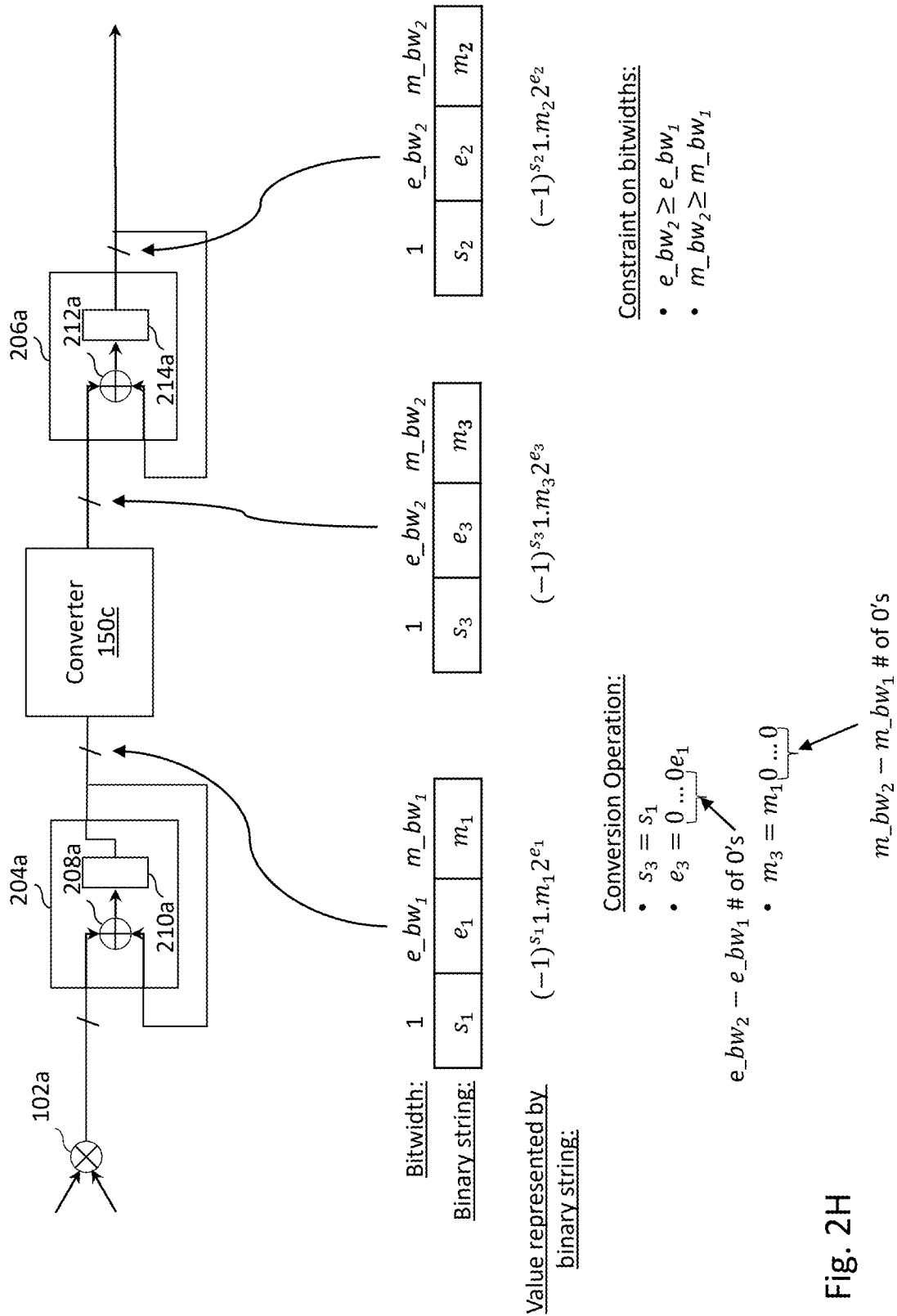
FIG. 2H depicts a variation of the system depicted in FIG. 2C for accumulating signed floating point numbers, in accordance with one embodiment of the invention.
Figure 21:
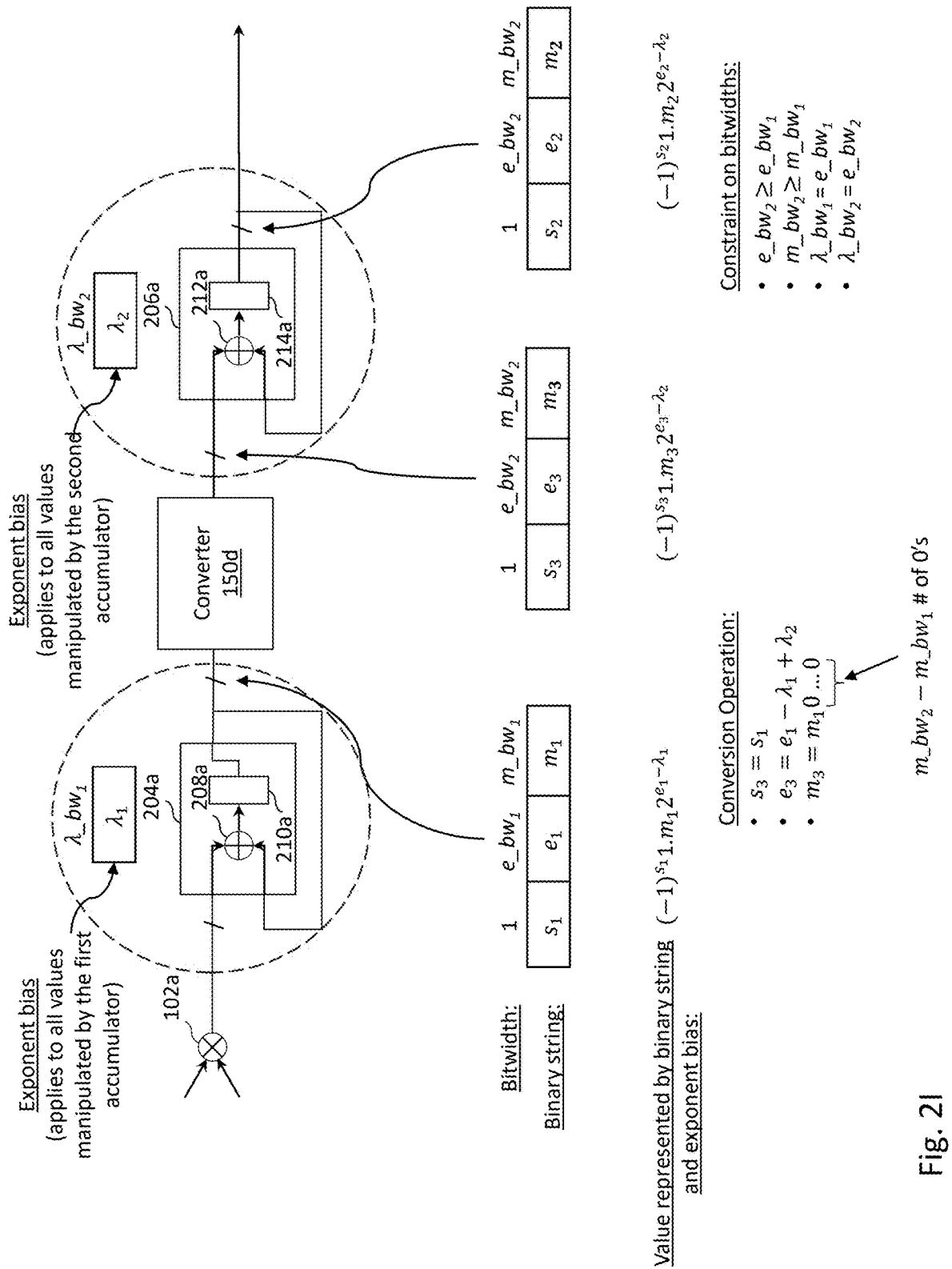

FIG. 2H depicts a variation of the system depicted in FIG. 2C for accumulating signed floating point numbers. The output of the first accumulator 204a may equal $(-1)^{s_1} 1 \cdot m_1 2^{e_1}$, in which the "." represents a binary point, $s_1$ represents a first sign with a bit width of 1, $m_1$ represents a first mantissa with a bit width of m_bw$_1$, and $e_1$ represents a first exponent with a bit width of e_bw$_1$. The output of the second accumulator 206a may equal $(-1)^{s_2} 1 \cdot m_2 2^{e_2}$, in which the "." represents a binary point, $s_2$ represents a second sign with a bit width of 1, $m_2$ represents a second mantissa with a bit width of m_bw$_2$, and $e_2$ represents a second exponent with a bit width of e_bw$_2$. The input of the second accumulator 206a may equal $(-1)^{s_3} 1 \cdot m_3 2^{e_3}$, in which the "." represents a binary point, $s_3$ represents a third sign with a bit width of 1, $m_3$ represents a third mantissa with a bit width of m_bw$_2$, and $e_3$ represents a third exponent with a bit width of e_bw$_2$.

In the embodiment of FIG. 2H, a bit width, m_bw$_2$, of a portion of storage element 214a of the second accumulator 206a that is allocated for storing the second mantissa, $m_2$, may be strictly greater than (or greater than or equal to) a bit width, m_bw$_1$, of a portion of storage element 210a of the first accumulator 204a that is allocated for storing the first mantissa, $m_1$. This choice of the respective mantissa bit widths (i.e., m_bw$_2$≤m_bw$_1$) allows the precision of the second accumulator 206a to be greater than or equal to the precision of the first accumulator 204a. Further, a bit width, e_bw$_2$, of a portion of storage element 214a of the second accumulator 206a that is allocated for storing the second exponent, $e_2$, may be strictly greater than (or greater than or equal to) a bit width, e_bw$_1$, of a portion of storage element 210a of the first accumulator 204a that is allocated for storing the first exponent, $e_1$. This choice of the respective exponent bit widths (i.e., e_bw$_2$≥ e_bw$_1$) allows the dynamic range of the second accumulator 206a to be greater than or equal to the dynamic range of the first accumulator 204a.

In order to match the bit width, e_bw$_2$, of the third exponent, $e_3$, that is provided to the second accumulator 206a, the first exponent, $e_1$, provided by the first accumulator 204a may be left padded by converter 150c with e_bw$_2$−e_bw$_1$ number of zeros. In order to match the bit width, m_bw$_2$, of the third mantissa, $m_3$, that is provided to the second accumulator 206a, the first mantissa, $m_1$, provided by the first accumulator 204a may be right padded by converter 150c with m_bw$_2$−m_bw$_1$ number of zeros. As to the sign, converter 150c may simply set the third sign, $s_3$, provided to the second accumulator 206a equal to the first sign, $s_1$, which is provided by the first accumulator 204a. While not depicted, it should be understood that the details of FIG. 2H may apply to one or more branches of the system 250 depicted in FIG. 2C. Similar to the discussion above, it is noted that the order in which the sign, exponent and mantissa are arranged in a bit string is not a critical detail. Further, there is no requirement for the sign, exponent and mantissa to be arranged within a single bit string.

FIG. 2I depicts a variation of the system depicted in FIG. 2C for accumulating signed floating point numbers with an exponent bias. The exponent bias allows for further flexibility in the dynamic range between the first accumulator 204a and the second accumulator 206a (beyond that provided by the possible change in the bit width of the exponent between the first and second accumulators). Typically, one exponent bias, $\lambda_1$ (which could be a positive or negative number), is selected for all values that are processed by the first accumulator 204a and one exponent bias, $\lambda_2$ (which could be a positive or negative number), is selected for all values that are processed by the second accumulator 206a. The exponent bias does not form part of the bitstring that encodes a value; rather it can be viewed as a global constant within each of the accumulators. As such, the exponent bias is not an input or output of converter 150d.

The output of the first accumulator 204a may equal $(-1)^{s_1} 1 \cdot m_1 2^{e_1 - \lambda_1}$ (unless "subnormal numbers" are permitted as explained below), in which the "." represents a binary point, $s_1$ represents a first sign with a bit width of 1, $m_1$ represents a first mantissa with a bit width of m_bw$_1$, $e_1$ represents a first exponent with a bit width of e_bw$_1$, and $\lambda_1$ represents a first exponent bias with a bit width of $\lambda$_bw$_1$. The output of the second accumulator 206a may equal $(-1)^{s_2} \cdot m_2 2^{e_2 - \lambda_2}$ (unless "subnormal numbers" are permitted), in which the "." represents a binary point, $s_2$ represents a second sign with a bit width of 1, $m_2$ represents a second mantissa with a bit width of m_bw$_2$, $e_2$ represents a second exponent with a bit width of e_bw$_2$, and $\lambda_2$ represents a second exponent bias with a bit width of $\lambda$_bw$_2$. The input of the second accumulator 206a may equal $(-1)^{s_3} 1 \cdot m_3 2^{e_3 - \lambda_2}$ (unless "subnormal numbers" are permitted), in which the "." represents a binary point, $s_3$ represents a third sign with a bit width of 1, $m_3$ represents a third mantissa with a bit width of m_bw$_2$, $e_3$ represents a third exponent with a bit width of e_bw$_2$, and $\lambda_2$ represents the second exponent bias.

In the embodiment of FIG. 2I, a bit width, m_bw$_2$, of a portion of storage element 214a of the second accumulator 206a that is allocated for storing the second mantissa, $m_2$, may be strictly greater than (or greater than or equal to) a bit width, m_bw$_1$, of a portion of storage element 210a of the first accumulator 204a that is allocated for storing the first mantissa, $m_1$. This choice of the respective mantissa bit widths (i.e., m_bw$_2$≥m_bw$_1$) allows the precision of the second accumulator 206a to be greater than or equal to the precision of the first accumulator 204a. Further, a bit width, e_bw$_2$, of a portion of storage element 214a of the second accumulator 206a that is allocated for storing the second exponent, $e_2$, may be strictly greater than (or greater than or equal to) a bit width, e_bw$_1$, of a portion of storage element 210a of the first accumulator 204a that is allocated for storing the first exponent, $e_1$. This choice of the respective exponent bit widths (i.e., e_bw$_2$≥e_bw$_1$) allows the dynamic range of the second accumulator 206a to be greater than or equal to the dynamic range of the first accumulator 204a. Further, a bit width, $\lambda$_bw$_1$, of a storage element (not depicted) of the first accumulator 204a that is allocated for storing the first exponent bias, $\lambda_1$, may be equal to the bit width, e_bw$_1$, of a portion of storage element 210a of the first accumulator 204a that is allocated for storing the first exponent, $e_1$. Similarly, a bit width, $\lambda$_bw$_2$, of a storage element (not depicted) of the second accumulator 206a that is allocated for storing the second exponent bias, $\lambda_2$, may be equal to the bit width, e_bw$_2$, of a portion of storage element 214a of the second accumulator 206a that is allocated for storing the second exponent, $e_2$.

In order to match the bit width, m_bw$_2$, of the third mantissa, m$_3$, that is provided to the second accumulator 206a, the first mantissa, m$_1$, provided by the first accumulator 204a may be right padded by converter 150d with m_bw$_2$−m_bw$_1$ number of zeros.

As to the conversion of the exponent, converter 150d may determine the third exponent, e$_3$ as follows. In "normal" representations of floating point numbers (in which numbers can be represented without a leading zero in the significand), the third exponent, e$_3$, is always a nonnegative number and is computed as max (0, e$_1$−λ$_1$+λ$_2$). It is worth noting that if the third exponent, e$_3$, exceeds the maximum range of bits, this represents an overflow (and the mantissa bits are discarded), and the third exponent, e$_3$, may be clamped to a pre-defined maximum value representation. If the expression e$_1$−λ$_1$+λ$_2$ evaluates to negative value, this represents an underflow (and the mantissa bits are similarly discarded), and the third exponent, e$_3$, may be clamped to a 0 value.

In "subnormal" representations of floating point numbers (in which numbers can be represented with a leading zero in the significand), the third exponent, e$_3$, is allowed to be a small negative number and is computed as max (v, e$_1$−λ$_1$+λ$_2$), in which v represents the largest negative number possible (i.e., largest in the sense of magnitude). As is known in the art, the use of subnormal numbers allows for a gradual underflow, as it allows a calculation to gradually lose precision when the result is small, as compared to "normal" representations of floating point numbers when all precision is lost when an underflow occurs. More details regarding "subnormal" representations of floating point numbers can be found in the IEEE754 standard.

As to the sign, converter 150d may simply set the third sign, s$_3$, equal to the first sign, s$_1$. While not depicted, it should be understood that the details of FIG. 2I may apply to one or more branches of the system 250 depicted in FIG. 2C. Similar to the discussion above, it is noted that the order in which the sign, exponent and mantissa are arranged in a bit string is not a critical detail. Further, there is no requirement for the sign, exponent and mantissa to be arranged within a single bit string.

While embodiment for handling unsigned floating points with an exponent bias was not depicted, it should be understood how such an embodiment would be implemented by modifying the unsigned floating point embodiment of FIG. 2G with the details regarding the exponent bias described in FIG. 2I.

Figure 3A:
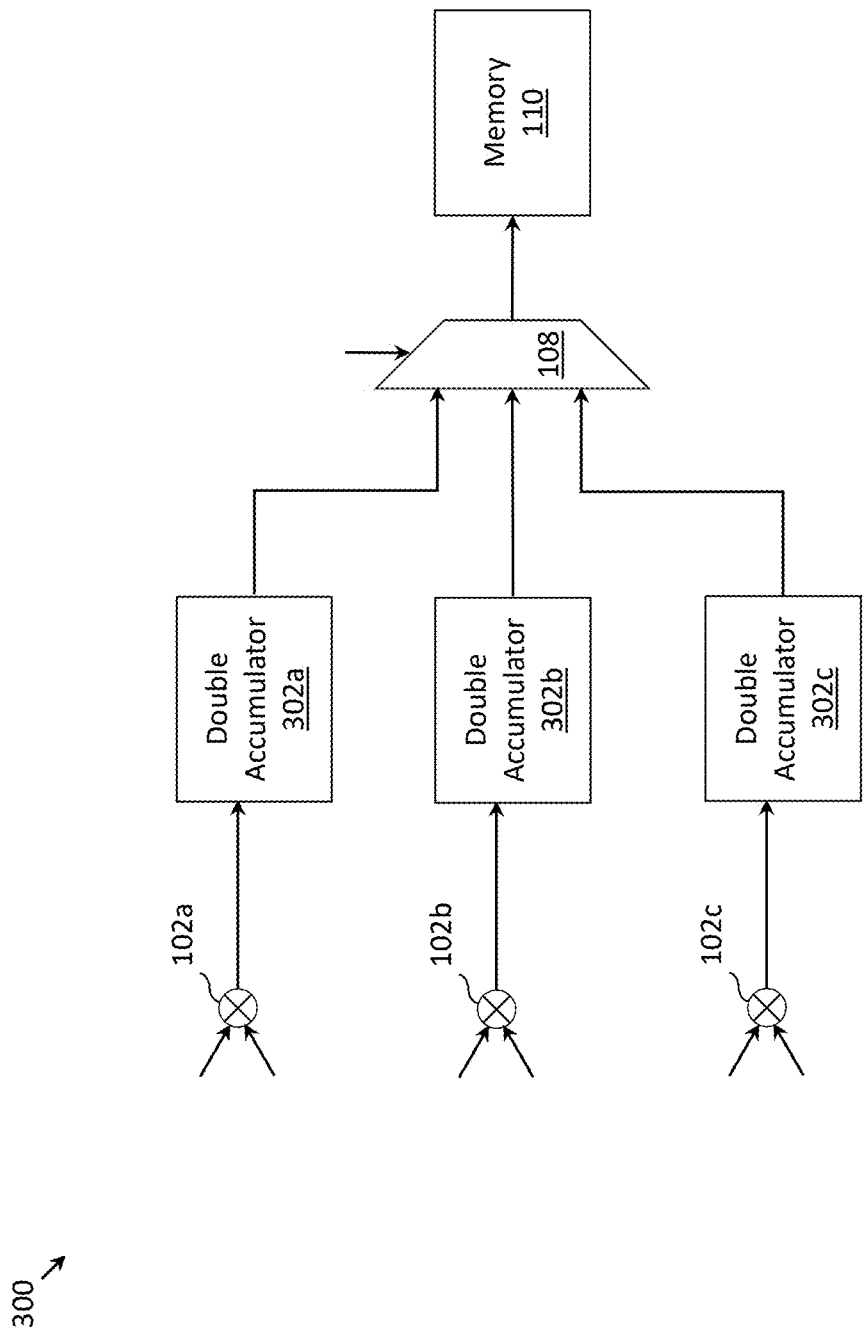
FIG. 3A depicts a variation of the system depicted in FIG. 2C, in which each pair of first accumulators and second accumulators is implemented using a double accumulator, in accordance with one embodiment of the invention.
Figure 3B:
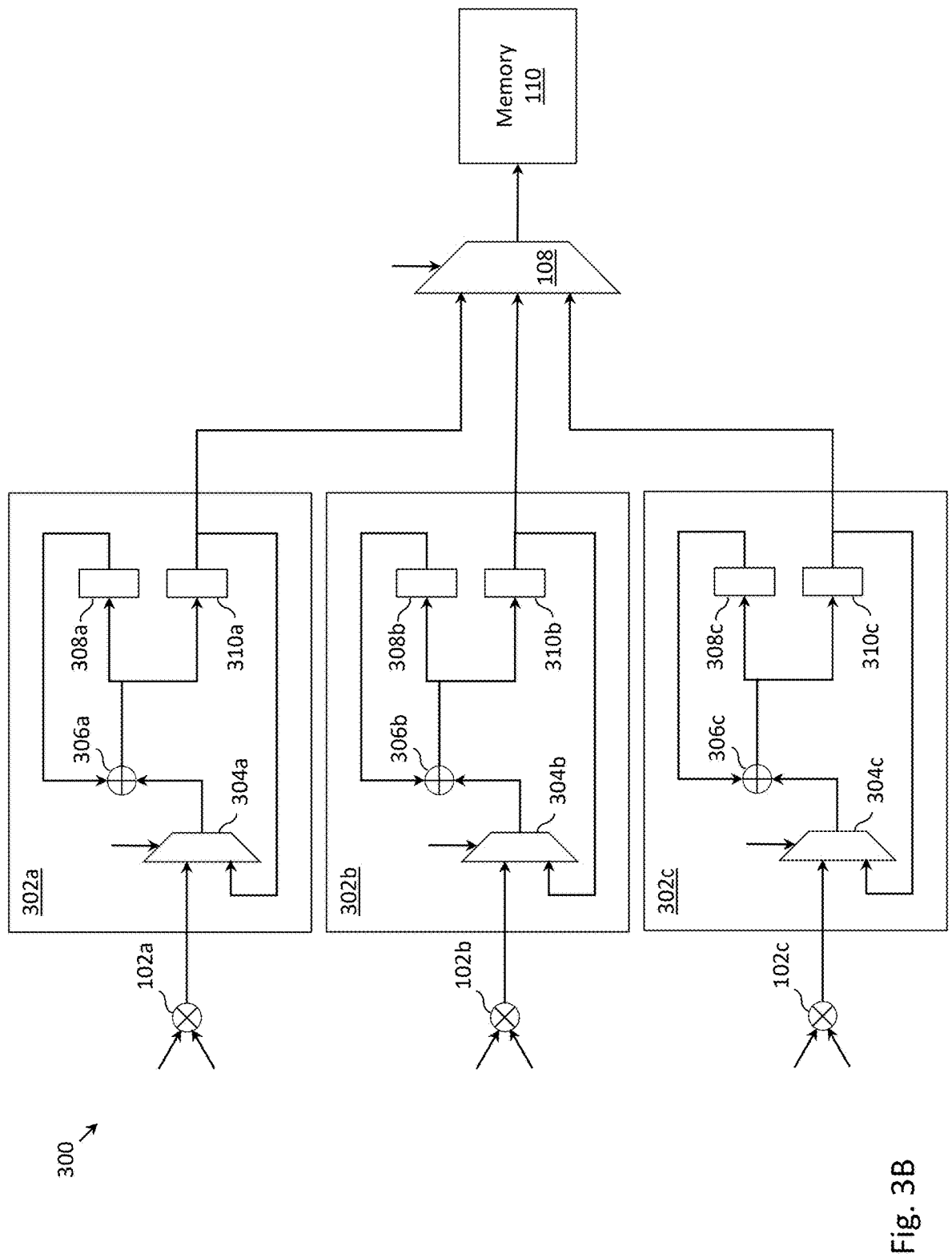
FIG. 3B depicts the internal details of each of the double accumulators, in accordance with one embodiment of the invention.
Figure 4:
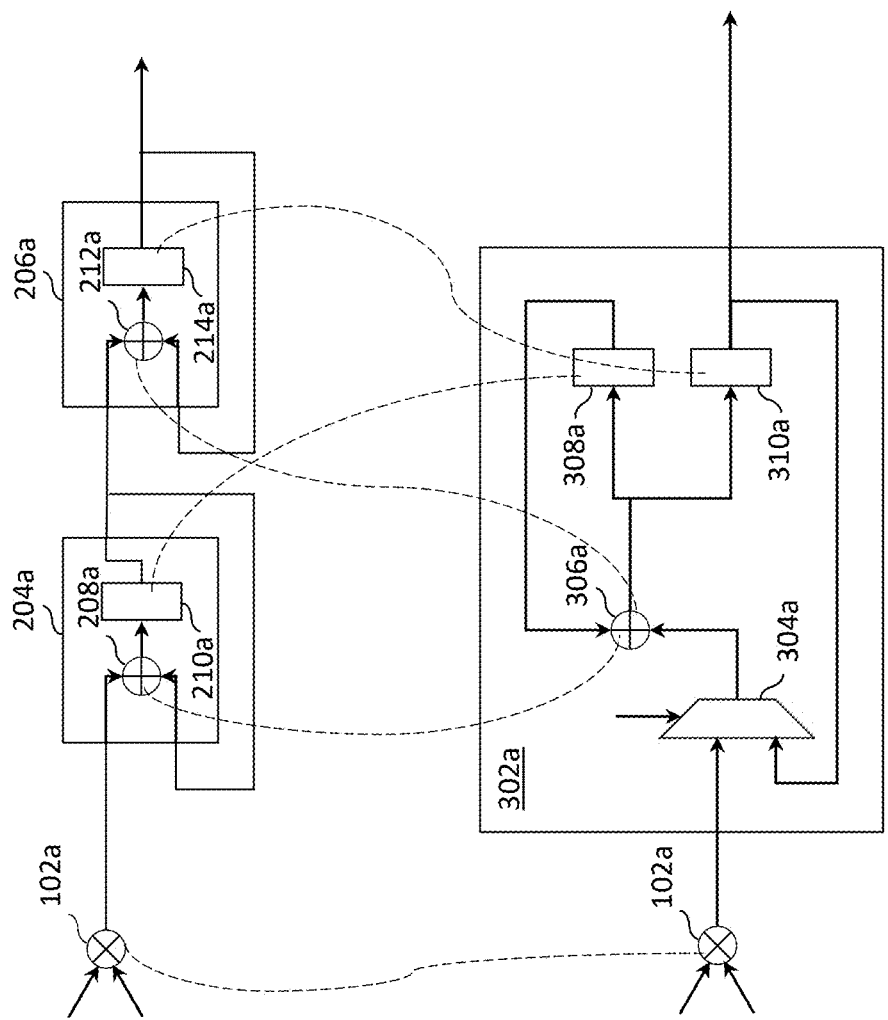
FIG. 4 depicts a mapping between components of the double accumulator and components of the first and second accumulators, in accordance with one embodiment of the invention.

FIG. 3A depicts system 300, a variation of the system 250 depicted in FIG. 2C, in which each pair of first accumulators and second accumulators is implemented using a double accumulator. A double accumulator carries out the respective functions of a first accumulator and a second accumulator, yet reduces the number of components by using a shared adder for both the first accumulator and the second accumulator (as will be described in more detail in FIG. 3B below).
Specifically:
The respective functions of first accumulator 204a and second accumulator 206a are carried out by double accumulator 302a.
The respective functions of first accumulator 204b and second accumulator 206b are carried out by double accumulator 302b.
The respective functions of first accumulator 204c and second accumulator 206c are carried out by double accumulator 302c.
FIG. 3B depicts the internal details double accumulator 302a, which will now be discussed before returning to the internal details of the other double accumulators 302b and 302c. FIG. 4 depicts a mapping between components of the double accumulator 302a and components of the first accumulator 204a and second accumulator 206a. Specifically:
Adder 306a of the double accumulator 302a maps to adder 208a of the first accumulator 204a and adder 212a of the second accumulator 206a.
Storage element 308a of the double accumulator 302a maps to storage element 210a of the first accumulator 204a.
Storage element 310a of the double accumulator 302a maps to storage element 214a of the second accumulator 206a.
With the output of the two-input multiplier 102a selected by the multiplexor 304a and the input to storage element 310a disabled (e.g., by turning off the clock signal to storage element 310a), double accumulator 302a may operate as the first accumulator 204a. With the output of storage element 310a selected by the multiplexor 304a and the input to storage element 308a disabled (e.g., by turning off the clock signal to storage element 308a), double accumulator 302a may operate as the second accumulator 206a.

Figure 5:
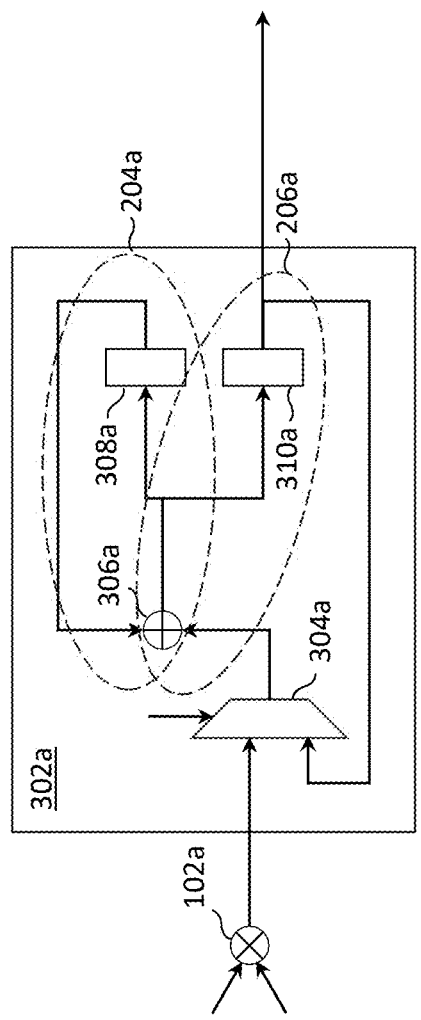
FIG. 5 annotates two accumulators of the double accumulator which share a common adder, in accordance with one embodiment of the invention.

As shown in FIG. 5, one may interpret adder 306a and storage element 308a of the double accumulator 302a mapping to first accumulator 204a, and adder 306a and storage element 310a mapping to second accumulator 206a. As such, an advantage of the design of double accumulator 302a is that it shares one adder between first accumulator 204a and the second accumulator 206a with the drawback of introducing the additional component of multiplexor 304a.

Figure 3C:
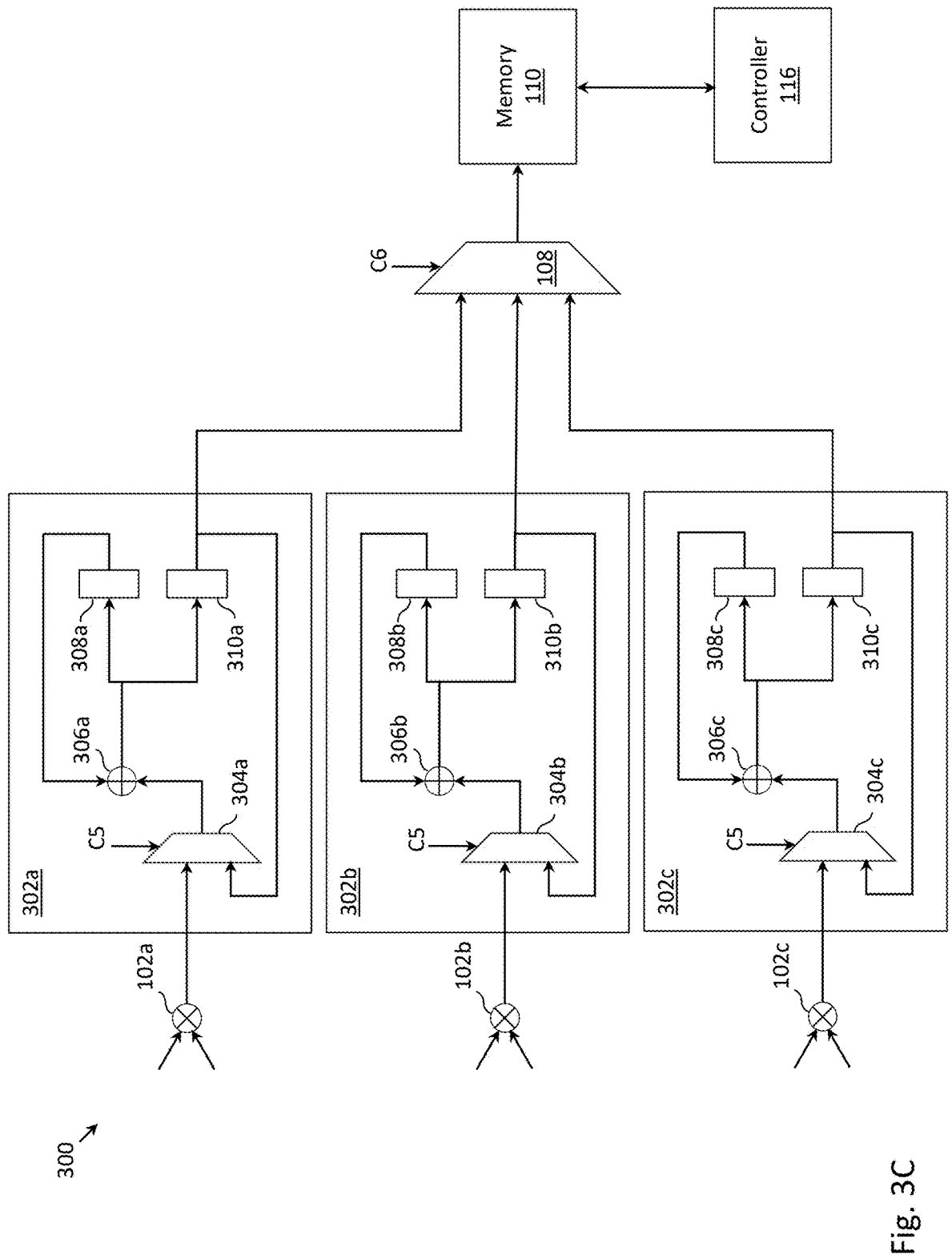
FIG. 3C depicts a controller for controlling the components of the system, in accordance with one embodiment of the invention.

Returning to FIG. 3B, the internal structure of double accumulators 302b and 302c will be discussed. Double accumulators 302b and 302c are identical to double accumulator 302a and thus only a brief description will be provided. Specifically:
Double accumulator 302b includes multiplexor 304b, adder 306b and storage elements 308b, 310b.
Double accumulator 302c includes multiplexor 304c, adder 306c and storage elements 308c, 310c.
FIG. 3C depicts controller 116 for controlling various components of system 300, which may include one or more of multiplexors 108, 304a-304c, storage elements 308a-308c, storage elements 310a-310c, and memory 110. For example, controller 116 may control, via control signal C5, whether adder 306a receives the output of the multiplier 102a or the output of the storage element 310a; controller 116 may control, via control signal C5, whether adder 306b receives the output of the multiplier 102b or the output of the storage element 310b; and controller 116 may control, via control signal C5, whether adder 306c receives the output of the multiplier 102c or the output of the storage element 310c. Further, controller 116 may control whether the output of the adder 306a is received by storage element 308a or 310a (e.g., by clock gating one of the storage elements), whether the output of the adder 306b is received by storage element 308b or 310b (e.g., by clock gating one of the storage elements), and whether the output of the adder 306c is received by storage element 308c or 310c (e.g., by clock gating one of the storage elements). Further, controller 116 may control, via control signal C6, which of the respective outputs of the double accumulators 302a, 3022b, 302c are stored into memory 110.

Figure 6:
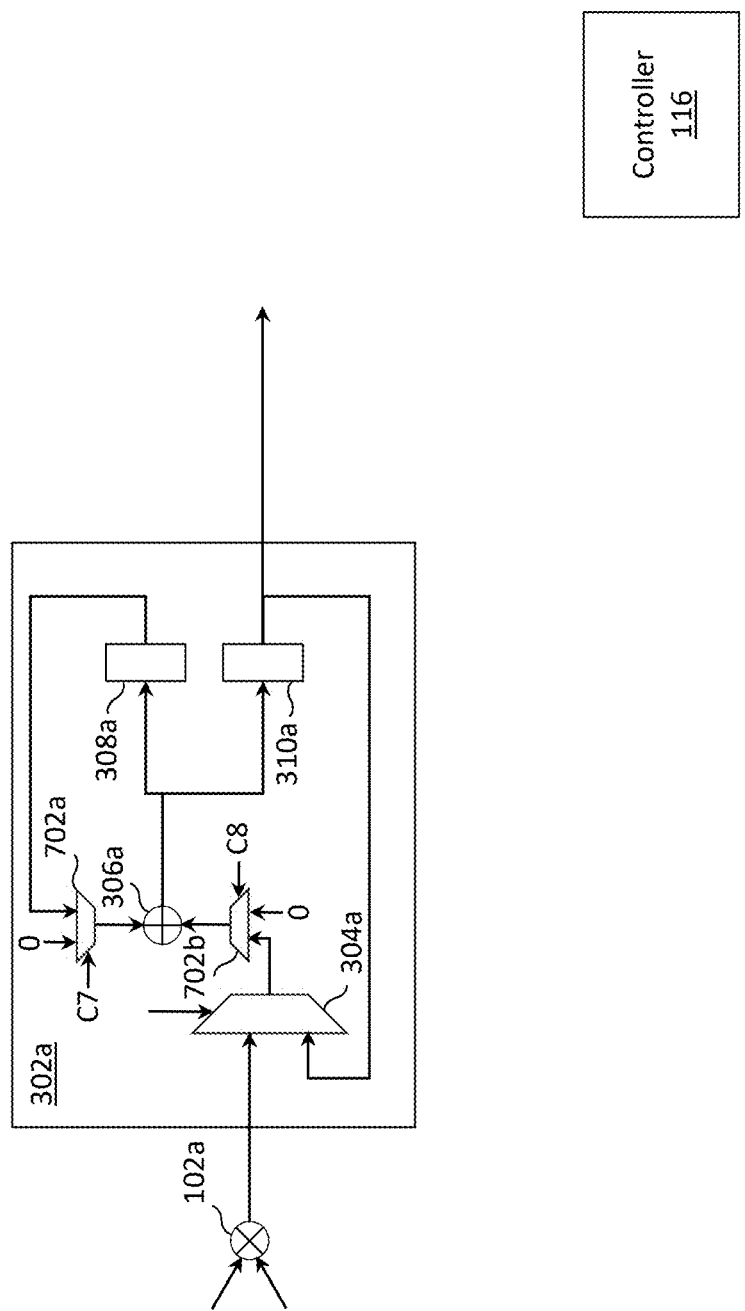
FIG. 6 depicts additional details (e.g., control logic) of the double accumulator for initializing the accumulators, in accordance with one embodiment of the invention.

FIG. 6 depicts additional details (e.g., control logic) of double accumulator 302a for initializing the accumulators. It is understood that a similar design may be employed for the other double accumulators 302b, 302c. The accumulator formed by adder 306a and storage element 308a may be initialized by forcing the value in the (upper) feedback loop to be a zero value (i.e., more specifically, by using control signal C7 to select the zero value in one of the input of multiplexor 702a). Due to this initialization action, the value stored at storage element 308a will be equal to the product provided by the multiplier 102a, and in effect, the previous running total stored at storage element 308a will be cleared. Similarly, the accumulator formed by adder 306a and storage element 310a may be initialized by forcing the value in the (lower) feedback loop to be a zero value (i.e., more specifically, by using control signal C8 to select the zero value in the input of multiplexor 702b). Due to this initialization action, the value stored at storage element 310a will be set equal to the output of multiplexor 702a, and in effect, the previous running total stored at storage element 310a will be cleared.

Figure 7:
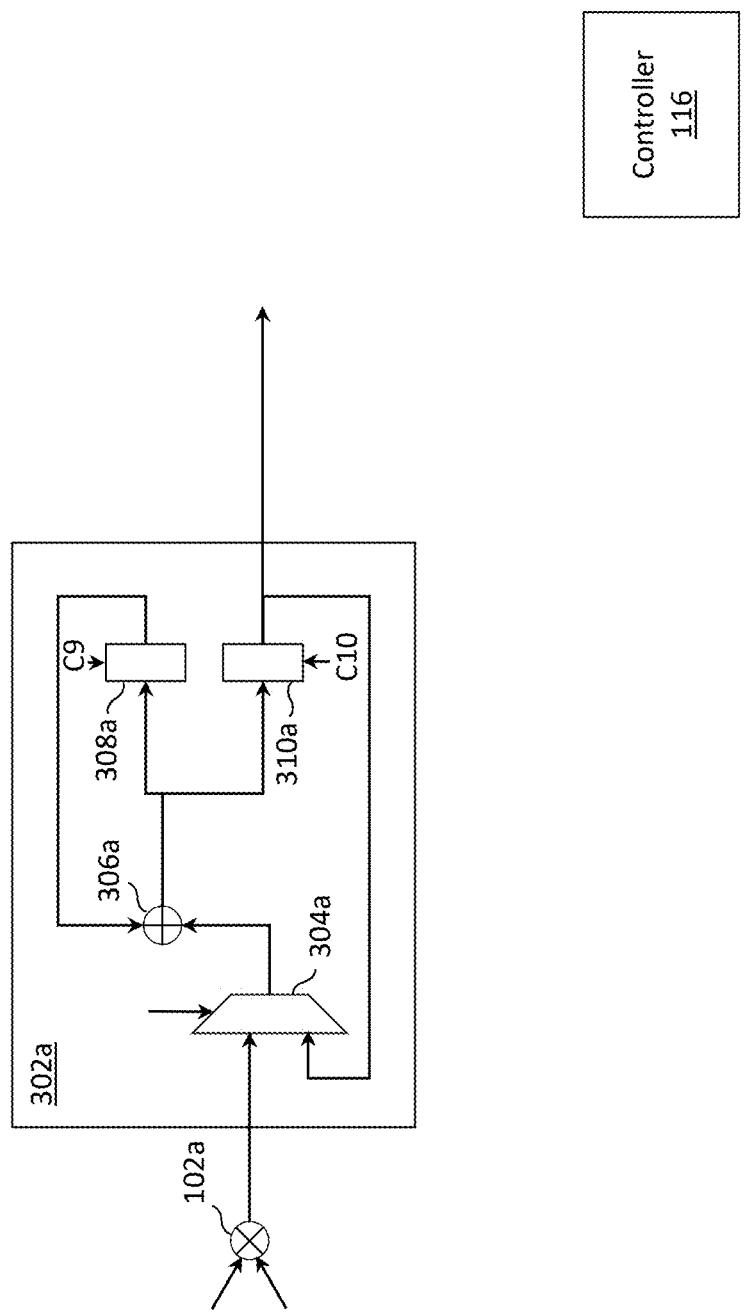
FIG. 7 depicts another approach for initializing the accumulators of the double accumulator, in accordance with one embodiment of the invention.

FIG. 7 depicts another approach for initializing the accumulators of the double accumulator. In the embodiment of FIG. 7, storage element 308a may be reset to a zero value via control signal C9, and storage element 310a may be reset to a zero value via control signal C10.

Figure 8A:
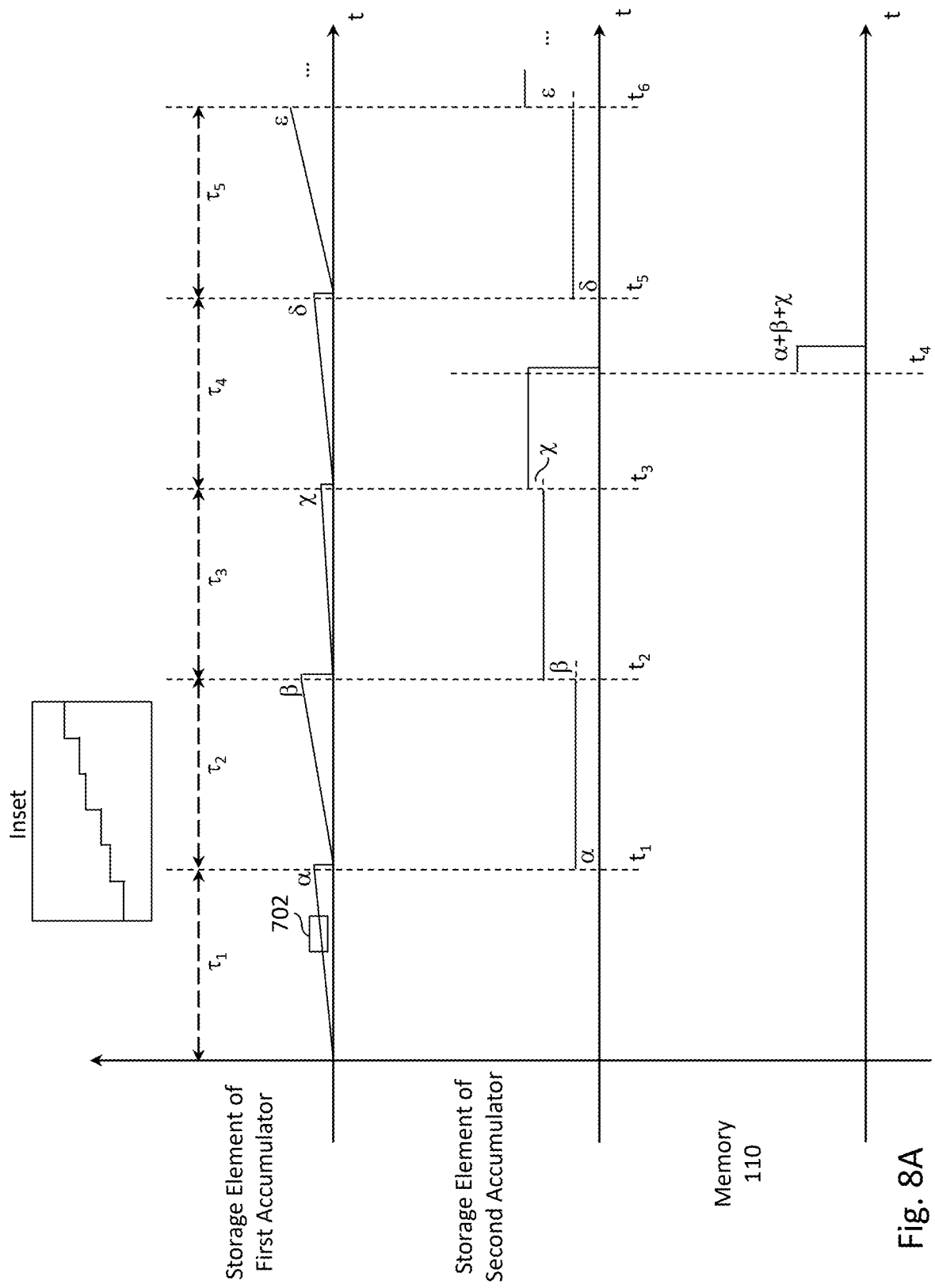
FIG. 8A depicts a time progression of the running totals stored in the storage elements of the first and second accumulators and the writing of a running total from the second accumulator to the memory, in accordance with one embodiment of the invention.

FIG. 8A depicts a time progression of the running totals stored in the storage elements of the first and second accumulators (for either system 250 or 300) and the writing of the running total from the second accumulator to the memory. For the sake of simplicity, the example computes a dot product every three time periods. Hence, one dot product is computed in time periods $\tau_1$ through $\tau_3$, one dot product is computed in time periods $\tau_4$ through $\tau_6$ (not depicted), and so on. In an actual implementation, it is contemplated that a dot product will be computed in more than three time periods.

In the top plot of FIG. 8A, the running total of the first accumulator (stored at storage element 210a or 308a) is shown incrementally increasing within a time period $\tau_1$. For simplicity of depiction, the plot of the running total appears as a linear line; however, it should be understood that in practice, the plot of the running total may be a non-linear line. A zoomed in view of a portion of the running total within window 702 is shown within the inset, in which each step corresponds to an accumulation operation of the first accumulator. While the example top plot of FIG. 8A assumes that the values being accumulated are positive (or non-negative), this is not always the case. More generally, the values being accumulated may be positive, negative or include positive and negative values. In some cases, the accumulated sums will tend toward ever-larger positive numbers, and in some cases toward ever larger-magnitude negative numbers, and sometimes the positive and negative contributions may tend to balance out so the accumulated sum stays near zero. Since it is unknown beforehand what the sum of values of a dot product will be, the methods and systems described herein are designed to handle any of these accumulation cases.

At the end of time period $\tau_1$, corresponding to time point $\tau_1$, the running total of the first accumulator with value α is saved in storage element 214a or 310a of the second accumulator. Immediately after time point $t_1$, the first accumulator may be initialized and the accumulation operation of the first accumulator resumes within time period $\tau_2$. At the end of time period $\tau_2$, corresponding to time point $t_2$, the running total of the first accumulator with value β is accumulated by the second accumulator, causing the running total α+β to be stored in storage element 310a of the second accumulator. Immediately after time point $t_2$, the first accumulator may be initialized and the accumulation operation of the first accumulator resumes within period $\tau_3$. At the end of time period $\tau_3$ corresponding to time point $t_3$, the running total of the first accumulator with value χ is accumulated by the second accumulator, causing the running total α+β+χ to be stored in storage element 214a or 310a of the second accumulator. Immediately after time point $t_3$, the first accumulator may be initialized and the accumulation operation of the first accumulator resumes within time period $\tau_4$.

At time point $t_4$, the running total α+β+χ (which may be the value of a dot product computed by the MAC unit) may be read from storage element 214a or 310a and stored within memory 110. Importantly, while the running total α+β+χ is waiting to be written to memory 110 or when the write of the running total α+β+χ to memory 110 is occurring, the accumulation at the first accumulator can continue in an uninterrupted fashion. Stated differently, the dual role of storage element 214a or 310a as a buffer (in addition to its role as part of the second accumulator) allows the memory bandwidth to be decoupled from the operation of MAC unit (at least if the memory bandwidth is not too constrained). A later example in FIG. 8E will show that if the write to memory 110 is sufficiently delayed, then the operation of the first accumulator may still be interrupted.

Immediately after the value from the second accumulator is stored in memory 110 at time point $t_4$, the second accumulator may be initialized. The operation then resumes in a similar manner to the operation in time period $\tau_1$. At the end of time period $\tau_4$, corresponding to time point $t_5$, the running total of the first accumulator with value δ may be saved in storage element 214a or 310a of the second accumulator. Immediately after time point $t_5$, the first accumulator may be initialized and the accumulation operation of the first accumulator resumes within time period $\tau_5$. At the end of time period $\tau_5$, corresponding to time point to, the running total of the first accumulator with value ε is accumulated by the second accumulator, causing the running total δ+ε to be stored in storage element 214a or 310a of the second accumulator. The example ends soon after time point to, but it should be understood that similar operations may continue for many additional time periods.

While the time periods $\tau_1 \ldots \tau_5$ are depicted as being equal in length to each other in FIG. 8A, this is not true in general. In an embodiment in which the time periods $\tau_1 \ldots \tau_5$ each span a predetermined number of accumulation operations, there may be some variation in the duration of each of the time periods $\tau_1 \ldots \tau_5$, as there may occasionally be some pauses between accumulation operations. The predetermined number may be a user-adjustable parameter, θ (also called a user-configurable parameter). More specifically, a total number of the values that are accumulated by the first accumulator between the initialization of the first accumulator and the accumulation of the output of the first accumulator by the second accumulator may be a user-adjustable parameter, θ. As explained below, this user-adjustable parameter, θ, may have important impacts on the performance (e.g., in terms of the precision and power consumption) of a multi-stage MAC unit (e.g., such as those depicted in FIG. 2C) as well as the performance of a neural network formed by many instances of the multi-stage MAC units.

In floating point arithmetic, the addition step of a multiply-accumulate operation (i.e., specifically the alignment step to align the binary points of the two floating point operands to the adder prior to the summation of the mantissa) requires right-shifting the mantissa of the smaller of the two operands by the difference of the respective exponents. In some cases, it is possible to completely eliminate or nearly-completely eliminate the bits (e.g., eliminate 80%, eliminate 90%, eliminate 95% of the bits) representing the mantissa of the smaller floating point operand if the difference of the exponents is larger than the number of mantissa bits. This issue is called swamping and results in a loss of precision in the result of the addition.

In the present case, the issue of swamping is relevant to the operation of the first accumulator (e.g., 204a) in which one of the operands is the product from the multiplier (e.g., product from multiplier 102a), and the other of the operands is the value from the feedback path from the first accumulator (e.g., running sum from storage element 210a). If the number of accumulation operations, θ, is capped at a lower number, the running sum of the first accumulator will be restricted to be a smaller number in magnitude, minimizing the potential difference in the respective exponents and the chances for swamping at the first accumulator. On the other hand, if the number of accumulation operations, θ, is capped at a lower number at the first accumulator, the second accumulator (e.g., accumulator 206a) will more frequently need to accumulate the partial sums of the first accumulator, increasing the power consumption of the multi-stage MAC unit (assuming an embodiment in which the second accumulator consumes more power than the first accumulator). Therefore, there is a design tradeoff with the user-adjustable parameter, θ. If the user-adjustable parameter, θ, is chosen to be a higher value, the probability of swamping increases, resulting in a loss of precision, and increased errors for the neural network as a whole (for which the multi-stage MAC unit is one component thereof). If the user-adjustable parameter, θ, chosen to be a lower value, the probability of swamping decreases, but the power consumption of the multi-stage MAC unit increases.

In one embodiment, the user-adjustable parameter, θ, may be chosen based on a probability of the first accumulator swamping. This probability of swamping may be determined through simulations, empirical measurements, mathematical analysis, etc.

In one embodiment (which may be in addition or separate from the above embodiment), the user-adjustable parameter, θ, may be chosen based on a distribution of the products generated by the multiplier (e.g., multiplier 102a). Intuitively, if the products are widely distributed (i.e., with a large standard deviation), there is a greater chance for the magnitude of the running sum of the first accumulator to significantly increase and lead to the swamping of the first accumulator.

In one embodiment (which may be in addition or separate from the above embodiment), the user-adjustable parameter, θ, may be chosen based on a number of bits of a storage element (e.g., 210a) of the first accumulator (e.g., 204a) that are allocated to store a mantissa which partially represents the output of the first accumulator. Intuitively, if the number of mantissa bits is larger, the user-adjustable parameter, θ, may be chosen to be higher before swamping occurs as more right-shifting of the mantissa of the smaller of the two floating operands can be performed before the bits representing the mantissa of the smaller of the two floating point operands are completely or nearly-completely eliminated.

In one embodiment (which may be in addition or separate from the above embodiment), the user-adjustable parameter, θ, may be chosen based on an error characteristic of a neural network that is implemented, in part, by the multi-stage MAC unit. In one embodiment, the error characteristic may be quantified by a mathematical function (e.g., a mathematically differentiable function, mean squared error, cross-entropy loss) related to the difference between the desired output (e.g., predicted label) of the neural network and the actual output (e.g., actual label). In another embodiment, the error characteristic may be quantified by the difference in error between the neural network when implemented with particular choice(s) of the user-adjustable parameter, θ, and the neural network when implemented with FP32 numbers (i.e., floating point numbers with 32 bits of precision—which can be considered a large number of bits which offers a high degree of precision).

Figure 13:
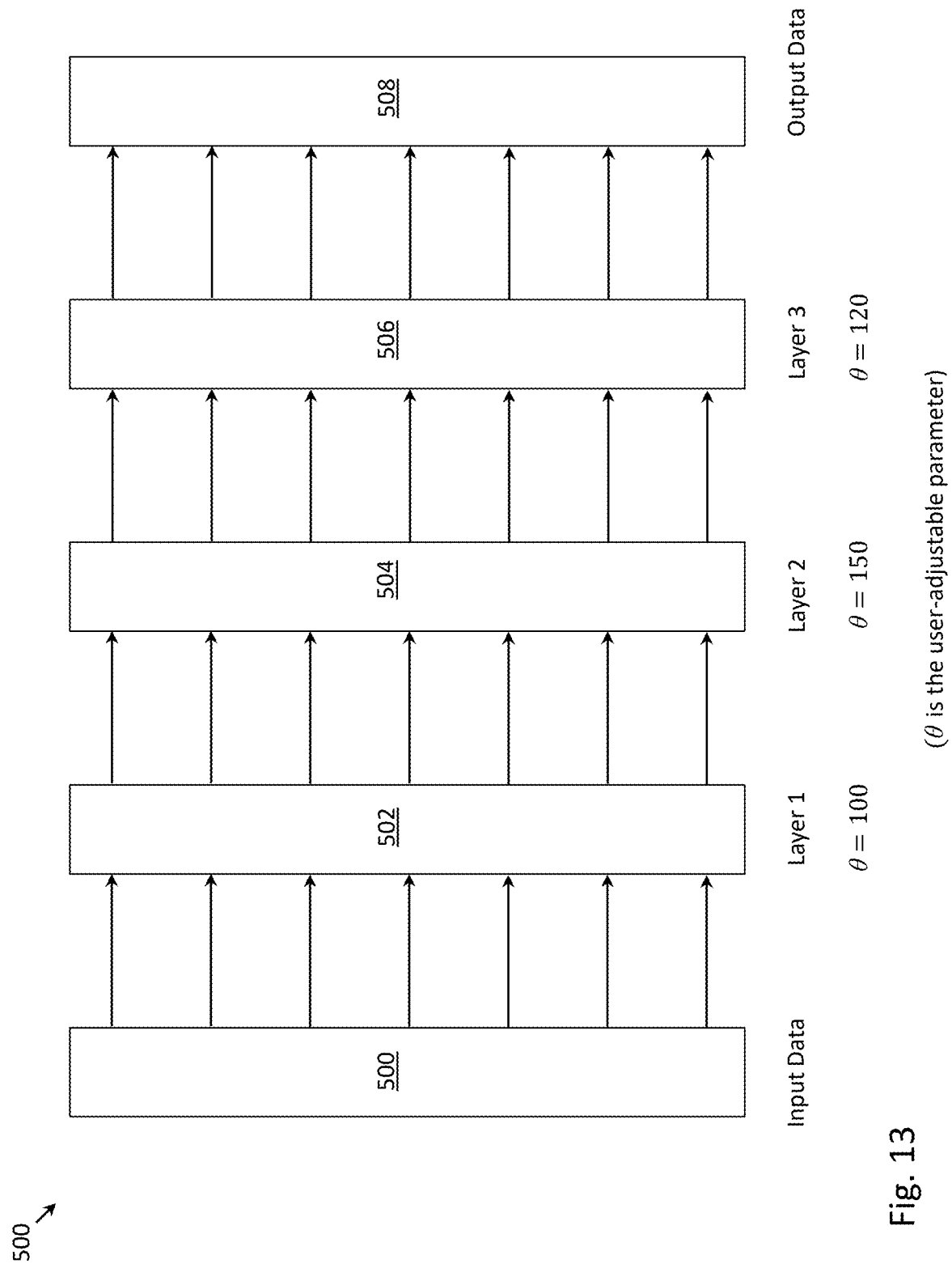
FIG. 13 depicts the layers of a neural network, along with values of a user-adjustable parameter, θ, chosen for each of the layers, in accordance with one embodiment of the invention.

In one embodiment, the user-adjustable parameter, θ, may be separately configurable for each layer of the neural network. Specifically, the user-adjustable parameter, θ, may be chosen to be a first value for a first layer of the neural network that is implemented, in part, by the MAC unit, and is chosen to be a second value different from the first value for a second layer of the neural network that is implemented, in part, by the MAC unit. FIG. 13 depicts a simplified example to illustrate this aspect of the embodiment of the invention. In the simplified neural network 500 of FIG. 13, three layers of the neural network 500 are represented as layer 1 (502), layer 2 (504) and layer 3 (506). The neural network 500 takes input data 500 as input and generates output data 508 as output. Layer 2 (504) may be disposed between layer 1 (502) and layer 3 (506). While three layers are depicted, it is understood that there may be a smaller or greater number of layers in the neural network 500. Further, the implementation of neural network 500 using conventional MAC units (e.g., those depicted in FIG. 1A) is known in the art, so these details have been omitted for conciseness. As should be understood, embodiments of the invention (in the context of FIG. 13) involve the use of the above-described multi-staged MAC units in place of the conventional MAC units.

Importantly, in the context of the multi-staged MAC units which make up the neural network 500, the user-adjustable parameter, θ, may be a first value (e.g., 100) when the multi-staged MAC units are configured (in conjunction with other circuit components) to implement layer 1 (502) of the neural network 500; the user-adjustable parameter, θ, may be a second value (e.g., 150) when the multi-staged MAC units are configured (in conjunction with other circuit components) to implement layer 2 (504) of the neural network 500; and the user-adjustable parameter, θ, may be a third value (e.g., 120) when the multi-staged MAC units are configured (in conjunction with other circuit components) to implement layer 3 (506) of the neural network 500. As should be apparent, the values for the user-adjustable parameter, θ, illustrated in FIG. 13 are examples only, and the embodiment of the invention is not meant to be limited to exactly these values. More generally, the user-adjustable parameter, θ, may be chosen based on the power consumption and precision requirements of a respective layer 502, 504, 506 of the neural network 500. As was previously described, an increase in the user-adjustable parameter, θ, may reduce the power consumption of a layer of the neural network 500, while a decrease in the user-adjustable parameter, θ, may increase the power consumption of that layer of neural network 500. Likewise, an increase in the user-adjustable parameter, θ, may reduce the precision of the computations performed by a layer of the neural network 500, while a decrease in the user-adjustable parameter, θ, may increase the precision of the computations performed by that layer of neural network 500.

Lastly, it is noted that in the context of a bank of MAC units (such as that depicted in FIG. 2C), in which the respective outputs of the MAC units are selectable by multiplexor 108, the same user-adjustable parameter, θ, may be applied to all MAC units within the bank of MAC units.

Figure 8B:
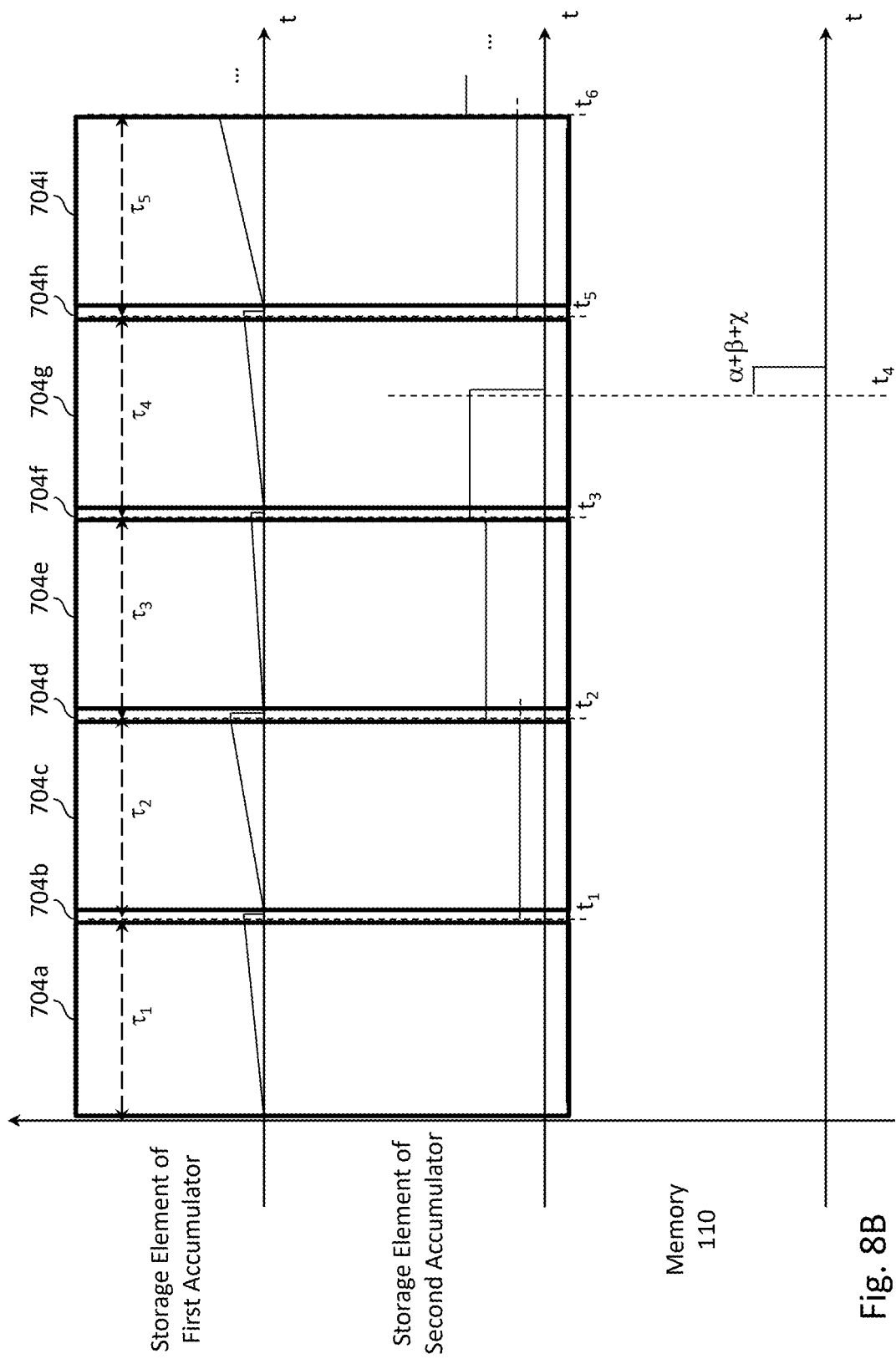
FIG. 8B depicts time windows (overlaid on top of FIG. 8A) showing the accumulation operation alternating between the first and second accumulators, in accordance with one embodiment of the invention.

FIG. 8B depicts time windows (overlaid on top of FIG. 8A) showing the accumulation operation alternating between the first accumulator and the second accumulator. In time windows 704a, 704c, 704e, 704g and 704i, the accumulation operations occur in the first accumulator, whereas in time windows 704b, 704d, 704f and 704h, the accumulation operations occur in the second accumulator. It should be apparent that the accumulation operations cannot occur simultaneously in the first accumulator and the second accumulator in the respective double accumulators, as the first accumulator and second accumulators share one common adder, and the first and second accumulators must take turns using the adder. In contrast, in the embodiment with two accumulators, each with its own adder (see FIG. 2C), the accumulation operations may occur simultaneously, as was previously described above in the pipelined operation in the context of FIG. 2D.

Figure 8C:
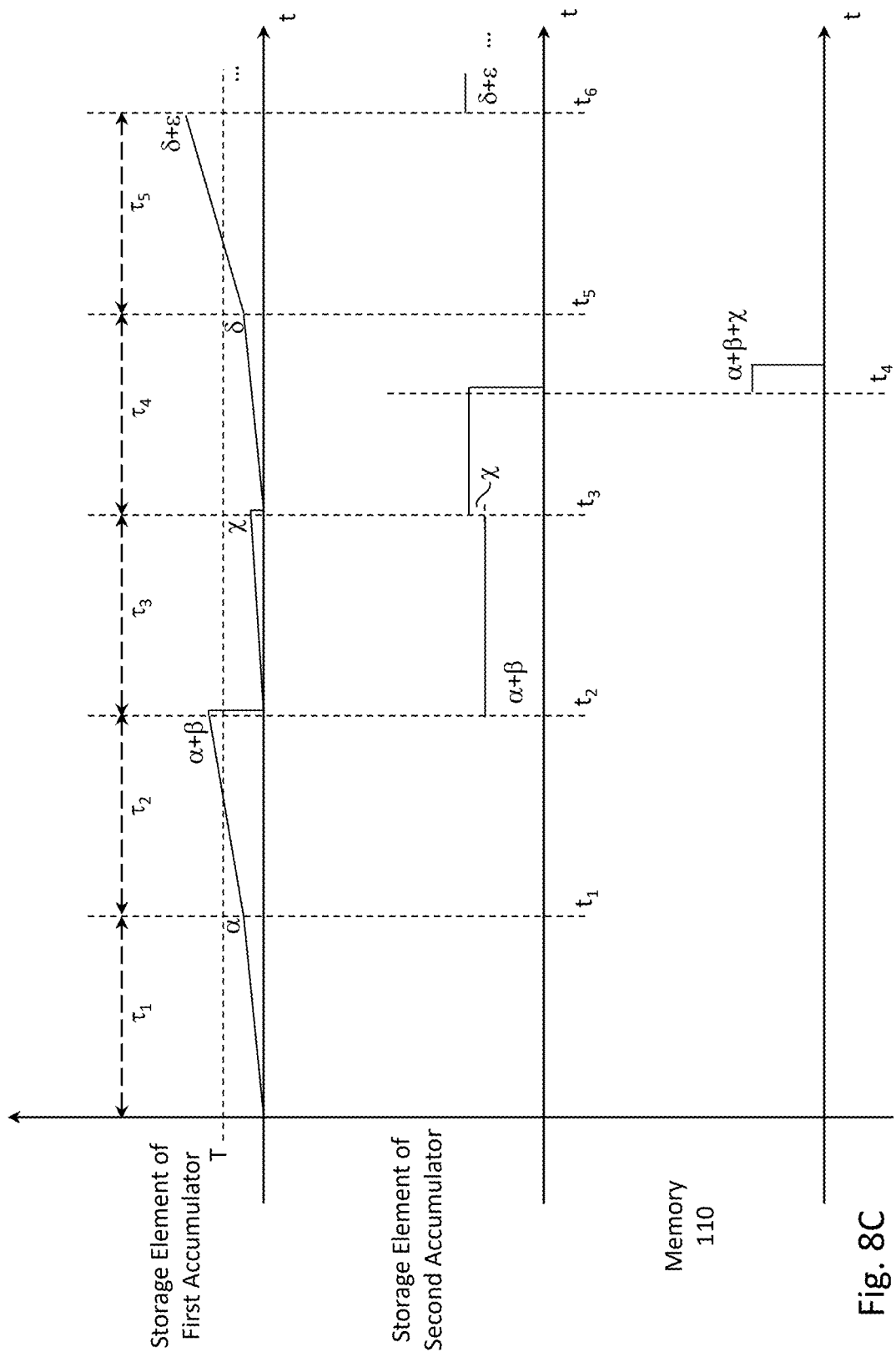
FIG. 8C depicts a variation of the operation depicted in FIG. 8A, in which the running total in the first accumulator may be compared with a predetermined threshold value before it is accumulated by the second accumulator, in accordance with one embodiment of the invention.

FIG. 8C depicts a variation of the operation depicted in FIG. 8A, in which the running total in the first accumulator may be compared with a predetermined threshold value, T, before it accumulated by the second accumulator. In the example of FIG. 8C, the running total of the first accumulator may be compared with the threshold value T at the end of time period $\tau_1$. Since the running total of the first accumulator with value of α does not exceed the threshold value T, the accumulation operation of the first accumulator continues into time period $\tau_2$. At the end of time period $\tau_2$, the running total of the first accumulator, now equal to α+β, is again compared with the threshold value T. This time, since the running total of the first accumulator exceeds the threshold value T, the running total α+β is stored at the second accumulator at time point $t_2$. Immediately after time point $t_2$, the first accumulator may be initialized and the accumulation operation of the first accumulator may resume within time period $\tau_3$. In the present example, time period $\tau_3$ is the final period for the computation of a dot product, so at the end of the time period $\tau_3$, the check of the threshold may be omitted and the running total of the first accumulator with value χ may be accumulated at the second accumulator even though the running total χ does not exceed the threshold value T. If this exception to the threshold comparison were not made, the running total of the second accumulator that read at time point $t_4$ would only be α+β, which would not accurately represent the value of the dot product. Immediately after time point $t_3$, the first accumulator may be initialized and the accumulation operation of the first accumulator may resume within time period $\tau_4$.

At time point $t_4$, the running total of the second accumulator with value α+β+χ may be written to memory 110. Immediately after this value is stored in memory 110, the second accumulator may be initialized. At the end of time period $\tau_4$, the running total of the first accumulator may be compared with the threshold value T. Since the running total of the first accumulator with value of δ does not exceed the threshold value T, the accumulation operation of the first accumulator continues into time period $\tau_5$. At the end of time period $\tau_5$, the running total of the first accumulator, now equal to δ+ε, is again compared with the threshold value T. This time, since the running total of the first accumulator exceeds the threshold value T, the running total δ+ε is stored in the second accumulator at time point $t_6$. The example ends soon after time point $t_6$, but it should be understood that similar operations may continue for many additional time periods. An advantage of the approach described in FIG. 8C is that it reduces the number of times that the first accumulator needs to be initialized, and furthermore, the running totals from the first accumulator that are accumulated at the second accumulator are (for the most part, except for the last accumulation period) assured to be greater than the threshold value T, which avoids the problem of "swamping" when a very small value is added to a very large value, potentially leading to a loss in precision.

FIG. 8D depicts time windows (overlaid on top of FIG. 8C) showing the accumulation operation alternating between the first accumulator and the second accumulator. In time windows 704j, 704l and 704n, the accumulation operations occur in the first accumulator, whereas in time windows 704k and 704m, the accumulation operations occur in the second accumulator.

Figure 8E:
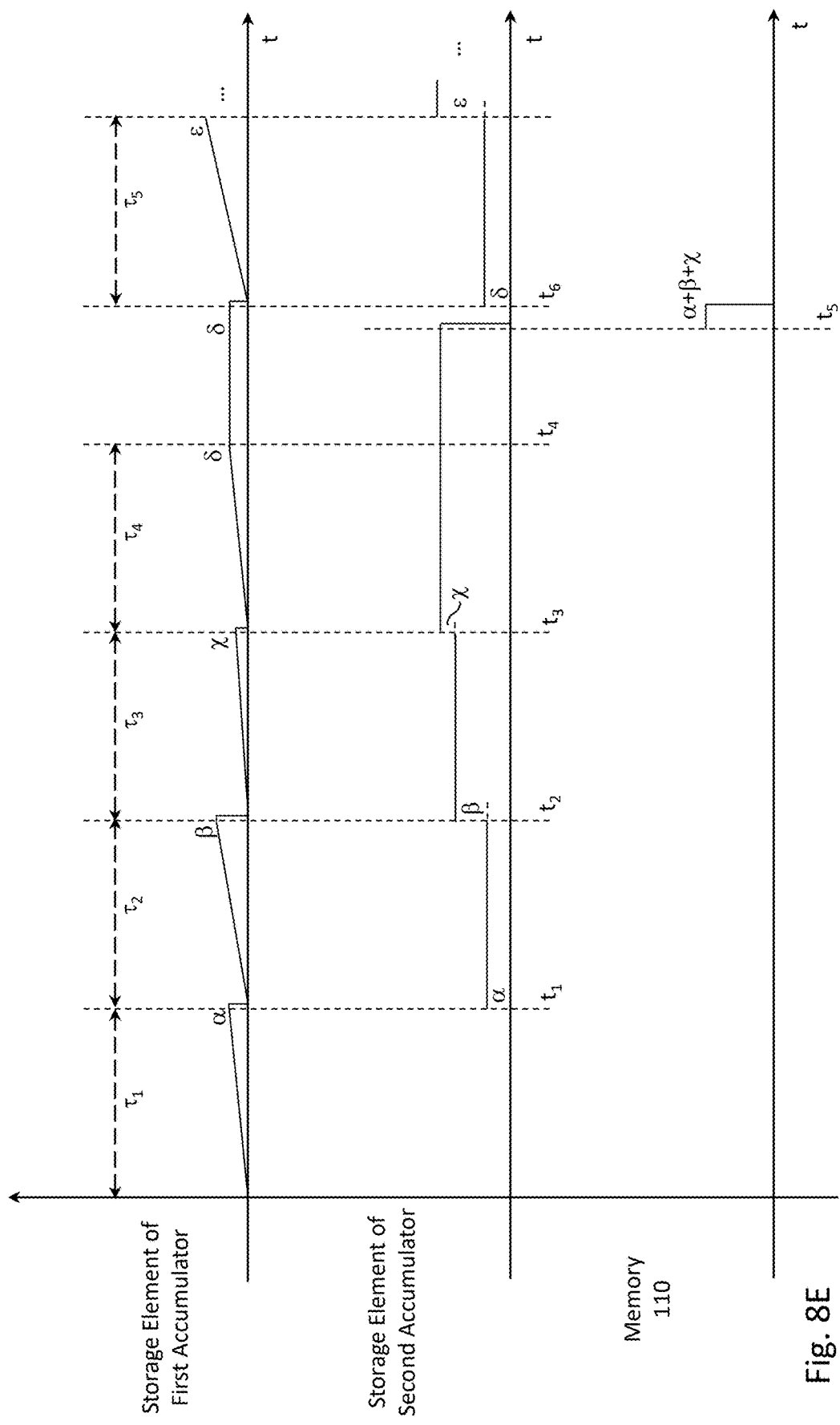
FIG. 8E depicts an example that illustrates the pausing of the accumulation operation at the first accumulator, while the running total at the second accumulator waits for its turn to be stored in the memory, in accordance with one embodiment of the invention.

FIG. 8E depicts an example that illustrates the pausing of the accumulation operation of the first accumulator, while a value stored in the buffer (i.e., storage element 310a) of the double accumulator waits for its turn to be stored to the memory 110. In the previous examples, the dot product α+β+χ that was computed in the first three time periods $\tau_1$ through $\tau_3$, was stored to memory 110 within time period $\tau_4$ (the first time period when the dot product was ready to be stored in memory 110), allowing the first accumulator to start computing the next dot product without any interruption. However, in the example of FIG. 8E, the dot product α+β+χ is unable to be stored to memory 110 within time period $\tau_4$ (e.g., memory 110 may have been reading dot products from other MAC units), causing the accumulation operation at the first accumulator to be paused at the end of time period $\tau_4$.

At time point $t_5$, the running total α+β+χ may finally be written from the second accumulator to memory 110 (after some delay). Immediately after this value is stored in memory 110, the second accumulator may be initialized. The operation then resumes in a similar manner to the operation in time period $\tau_1$. At time point $t_5$, the running total of the first accumulator with value δ is stored in the second accumulator. Immediately after time point $t_5$, the first accumulator may be initialized and the accumulation operation of the first accumulator resumes within time period $\tau_5$. At the end of time period $\tau_5$, corresponding to time point $t_6$, the running total of the first accumulator with value ε is accumulated by the second accumulator, causing the running total δ+ε to be stored in the second accumulator. The example ends soon after time point $t_6$, but it should be understood that similar operations may continue for many additional time periods.

Figure 8F:
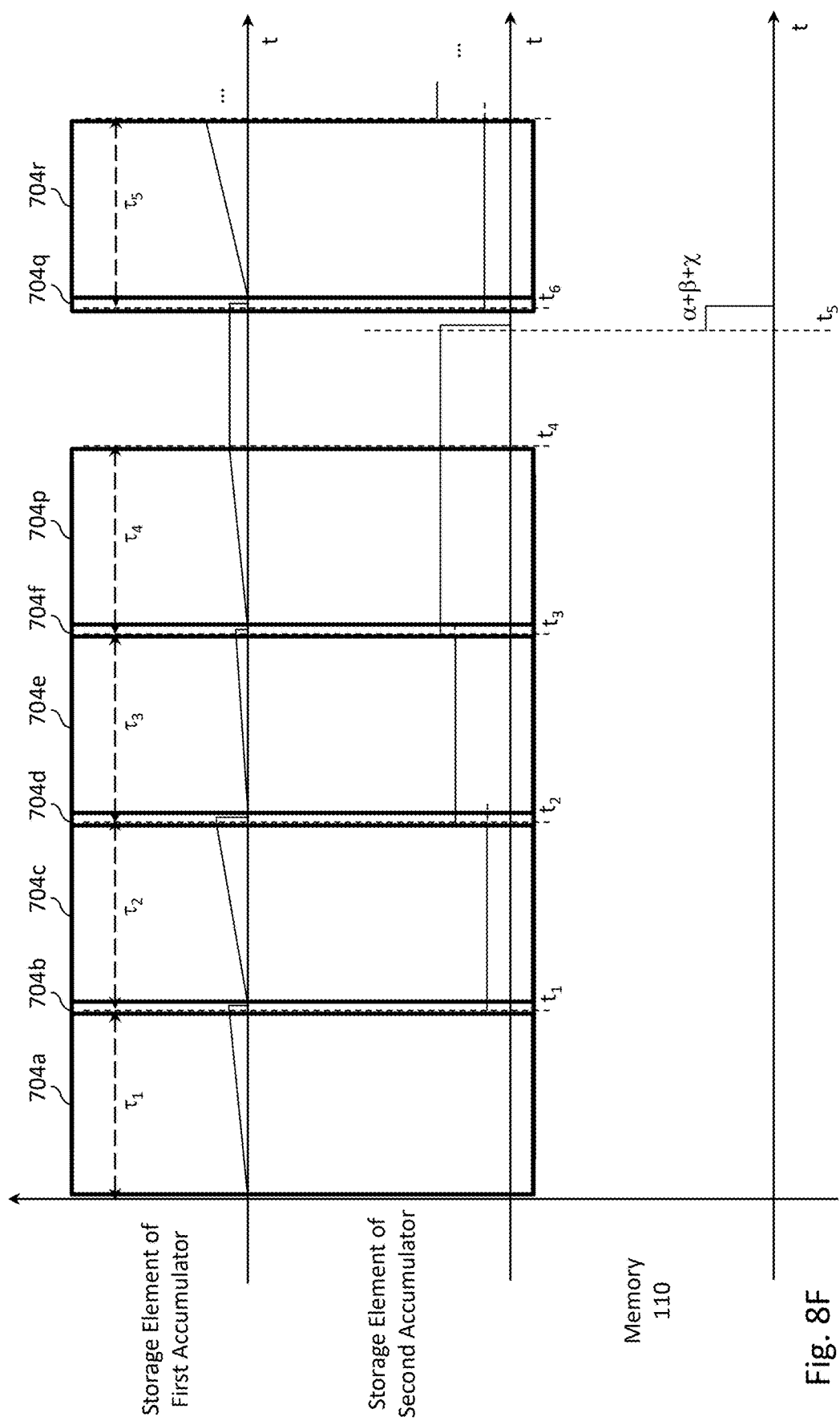
FIG. 8F depicts time windows (overlaid on top of FIG. 8E) showing the accumulation operation alternating between the first and second accumulators, in accordance with one embodiment of the invention.

FIG. 8F depicts time windows (overlaid on top of FIG. 8E) showing the accumulation operation alternating between the first and second accumulators. In time windows 704a, 704c, 704e, 704p and 704r the accumulation operations occur in the first accumulator, whereas in time windows 704b, 704d, 704f and 704q, the accumulation operations occur in the second accumulator.

Figure 9A:
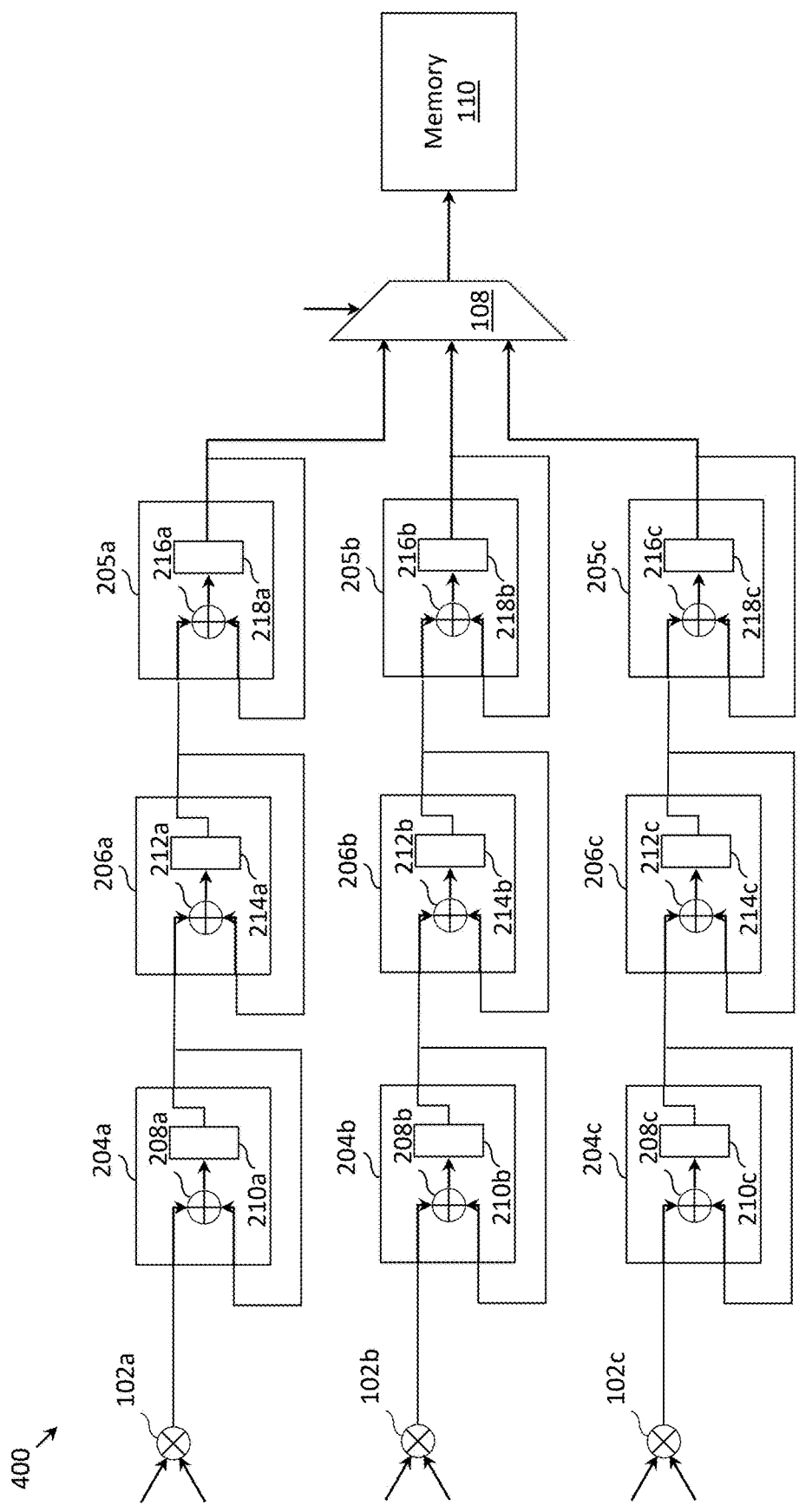
FIG. 9A depicts a system in which each of the MAC units comprises three stages of accumulators, in accordance with one embodiment of the invention.

FIG. 9A depicts system 400 in which each of the MAC units comprises three stages of accumulators. Three stages of accumulators is a natural extension of the previously discussed example with two stages of accumulators, so this embodiment is not discussed in as much detail as the previous examples. In system 400, accumulators 204a, 204b and 204c may still be referred to as first accumulators, and accumulators 206a, 206b and 206c may still be referred to as second accumulators, but accumulators 205a, 205b, 205c which may be referred to as third accumulators are newly added. For the sake of completeness, the internal components of the third accumulators 205a, 205b, 205c are described below:

Third accumulator 205a may include two-input adder 216a and storage element 218a.

Third accumulator 205b may include two-input adder 216b and storage element 218b.

Third accumulator 205c may include two-input adder 216c and storage element 218c.

Figure 9B:
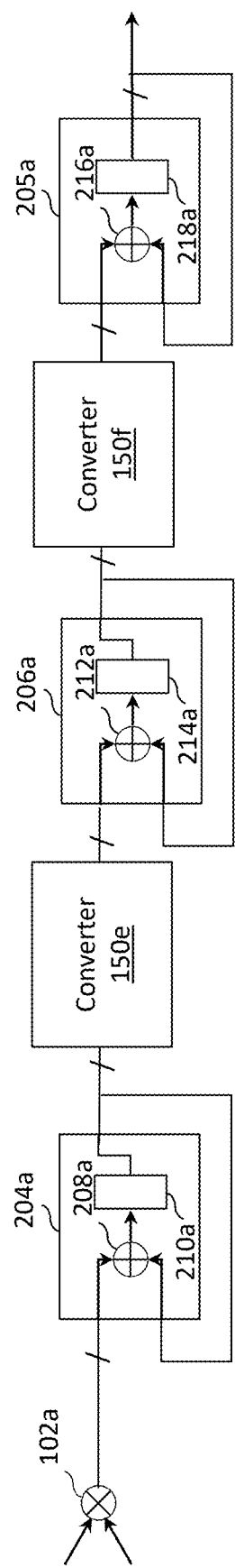
FIG. 9B depicts additional details concerning the bit widths of the system depicted in FIG. 9A, in accordance with one embodiment of the invention.

FIG. 9B depicts converter 150e disposed between the first accumulator 204a and the second accumulator 206a, and converter 150f disposed between the second accumulator 206a and the third accumulator 205a. Similar to the previously described embodiments, a bit width of an input of second accumulator 206a may be greater than a bit width of an output of first accumulator 204a; and a bit width of an input of third accumulator 205a may be greater than a bit width of an output of second accumulator 206a. In one embodiment, each of converters 150e and 150f is implemented in accordance with the previously described converter 150a for handling the accumulation of integers. In one embodiment, each of converters 150e and 150f is implemented in accordance with the previously described converter 150b for handling the accumulation of unsigned floating point numbers. In one embodiment, each of converters 150e and 150f is implemented in accordance with the previously described converter 150c for handling the accumulation of signed floating point numbers. In one embodiment, each of converters 150e and 150f is implemented in accordance with the previously described converter 150d for handling the accumulation of signed floating point numbers with an exponent bias.

Figure 10:
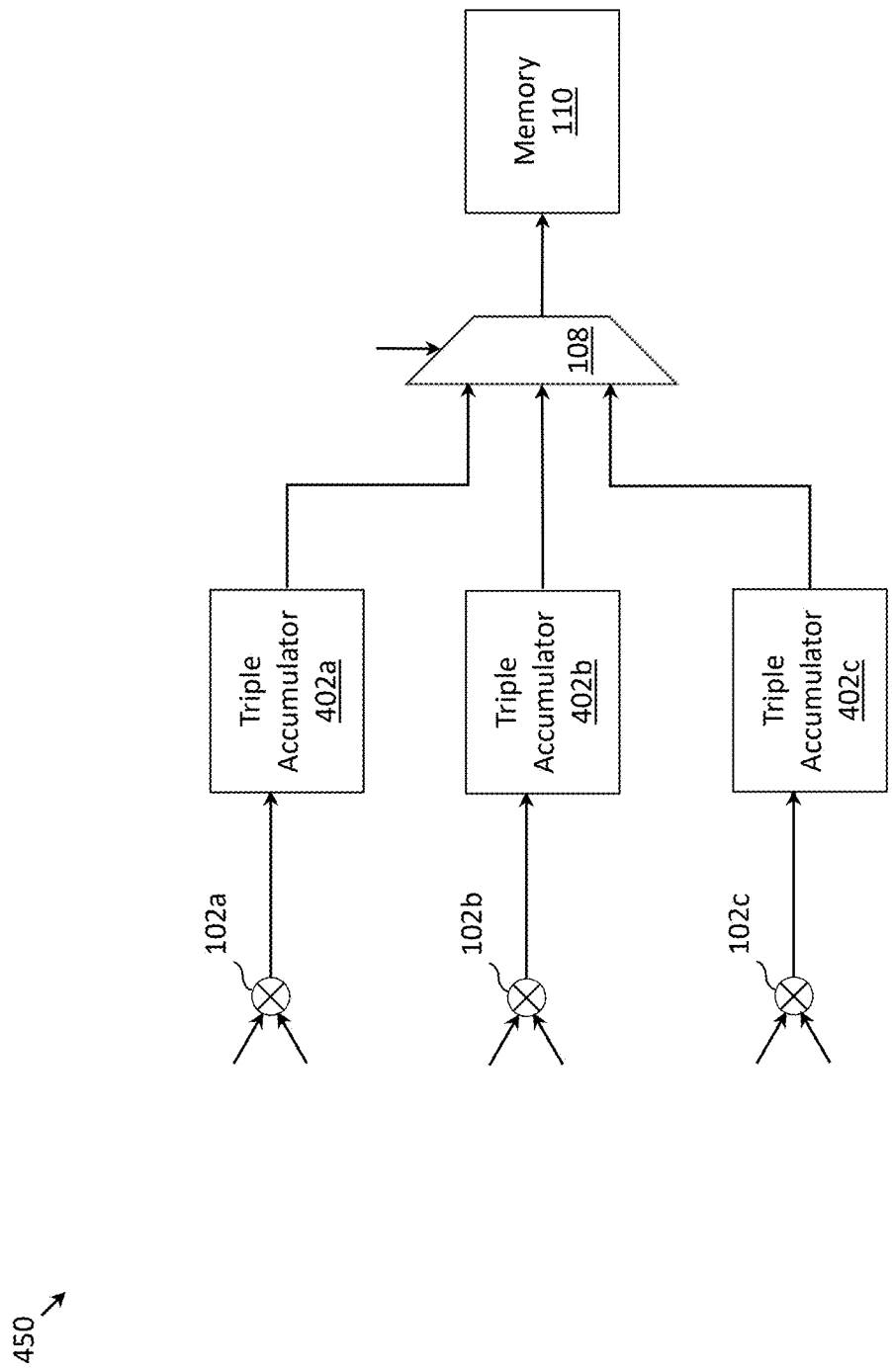
FIG. 10 depicts a variant of the system depicted in FIG. 9A, in which the three stages of accumulators are implemented using triple accumulators, in accordance with one embodiment of the invention.

FIG. 10 depicts system 450, a variant of the system depicted in FIG. 9A, in which the three stages of accumulators are implemented using triple accumulators 402a, 402b and 402c. A triple accumulator carries out the respective functions of the first, second and third accumulators, yet reduces the number of components by using a shared adder for all of the accumulators as will be described in more detail in FIG. 12 below.

Specifically:

The respective functions of first accumulator 204a, second accumulator 206a and third accumulator 205a are carried out by triple accumulator 402a.

The respective functions of first accumulator 204b, second accumulator 206b and third accumulator 205b are carried out by triple accumulator 402b.

The respective functions of first accumulator 204c, second accumulator 206c and third accumulator 205c are carried out by triple accumulator 402c.

Figure 11A:
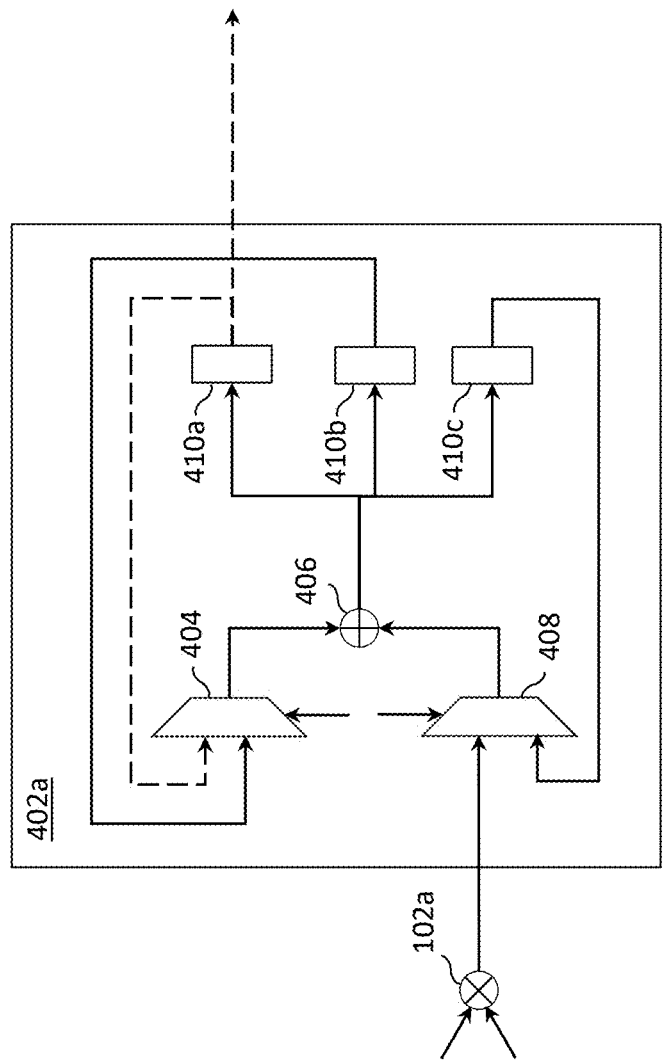
FIG. 11A depicts the internal details of one of the triple accumulators, in accordance with one embodiment of the invention.
Figure 11B:
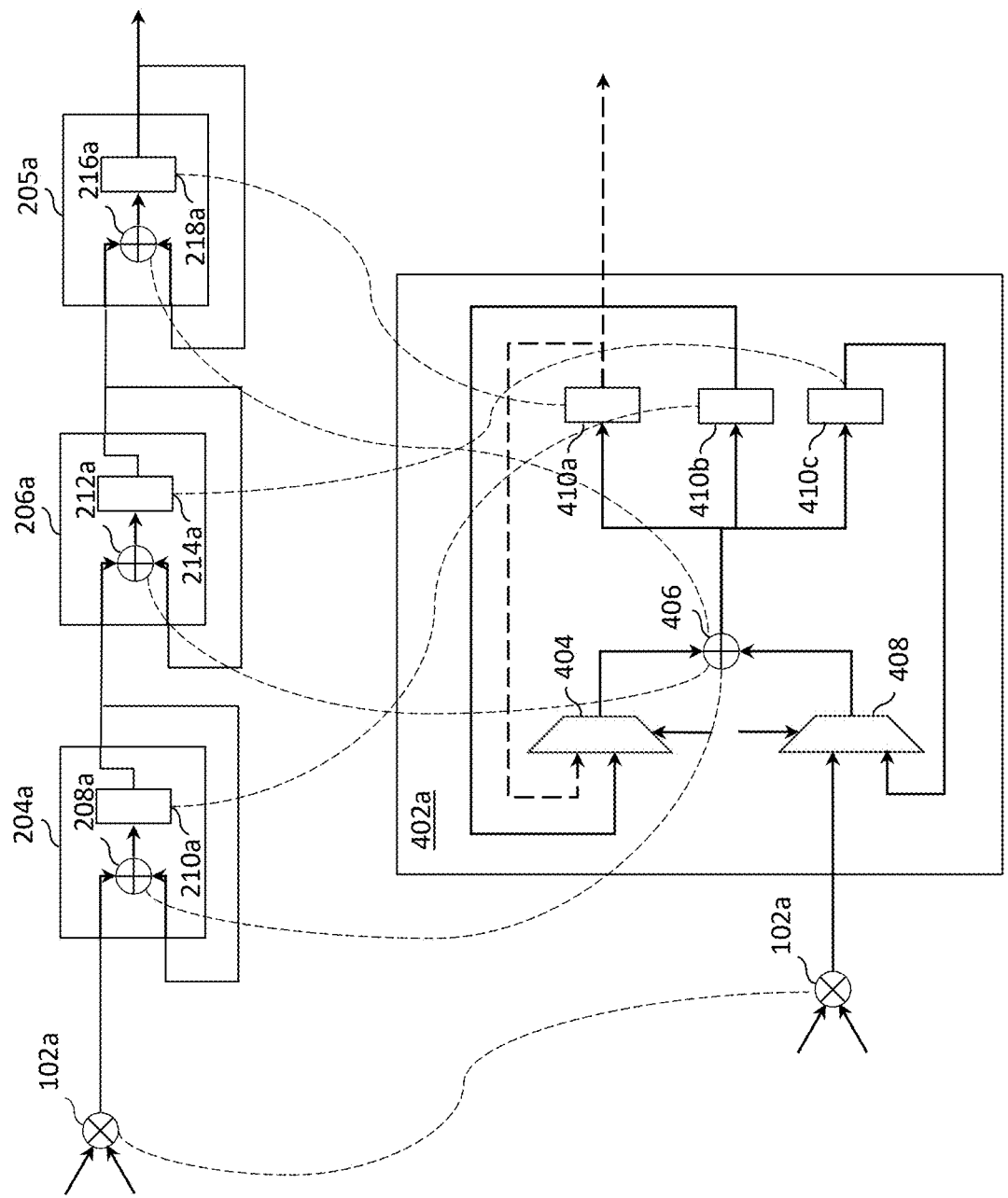
FIG. 11B depicts a mapping between components of the triple accumulator and components of the first, second and third accumulators, in accordance with one embodiment of the invention.

FIG. 11A depicts the internal details of triple accumulator 402a, and it is understood that the internal details of the other triple accumulators may be identical to that of triple accumulator 402a. For clarity, the output of storage element 410a is depicted in a dashed line and the output of storage element 410b is depicted in a solid line to clearly show the cross-over in the respective signal paths. FIG. 11B depicts a mapping between components of the triple accumulator 402a and components of the first accumulator 204a, second accumulator 206a and third accumulator 205a. Specifically:

Adder 406 of the triple accumulator 402a maps to adder 208a of the first accumulator 204a, adder 212a of the second accumulator 206a and adder 216a of the third accumulator 205a.

Storage element 410b of the triple accumulator 402a maps to storage element 210a of the first accumulator 204a.

Storage element 410c of the triple accumulator 402a maps to storage element 214a of the second accumulator 206a.

Storage element 410a of the triple accumulator 402a maps to storage element 218a of the third accumulator 205a.

With the output of the two-input multiplier 102a selected by multiplexor 408 and the respective inputs to storage elements 410a and 410c disabled (e.g., by turning off the clock signal to storage elements 410a and 410c), triple accumulator 402a may operate as the first accumulator 204a. With the output of storage element 410c selected by the multiplexor 408, the output of storage element 410b selected by multiplexor 404, and the respective inputs to storage elements 410a and 410b disabled (e.g., by turning off the clock signal to storage elements 410a and 410b), triple accumulator 402a may operate as the second accumulator 206a. With the output of storage element 410c selected by the multiplexor 408, the output of storage element 410a selected by multiplexor 404, and the respective inputs to storage elements 410b and 410c set to zero (e.g., by turning off the clock signal to storage elements 410b and 410c), triple accumulator 402a may operate as the third accumulator 205a.

Figure 12:
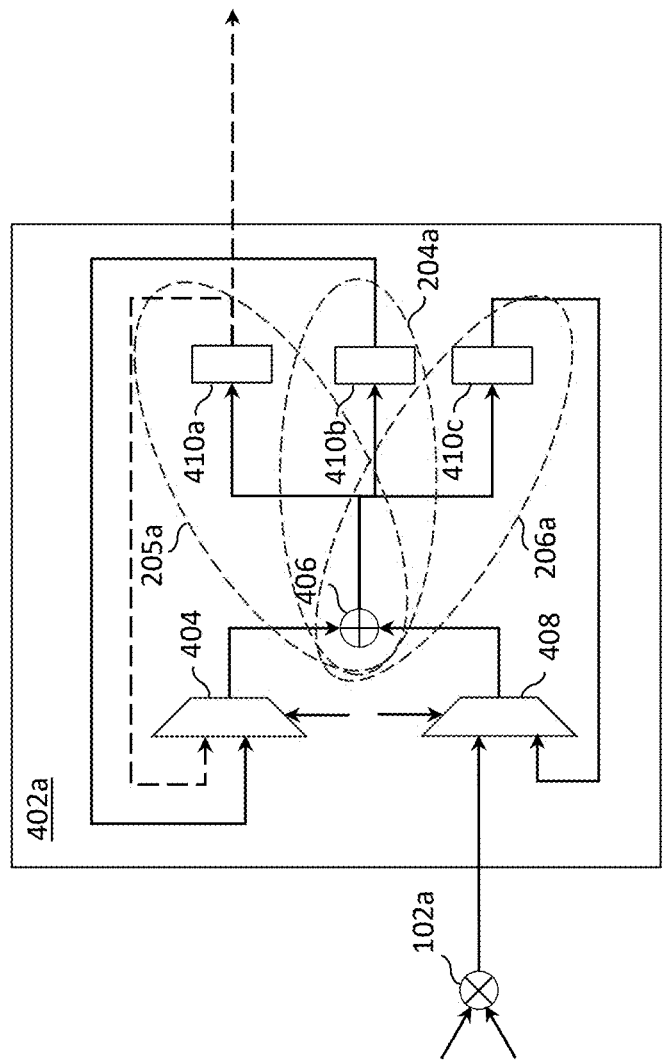
FIG. 12 annotates three accumulators of the triple accumulator which share a common adder, in accordance with one embodiment of the invention.

As shown in FIG. 12, one may interpret adder 406 and storage element 410b of the triple accumulator 402a mapping to first accumulator 204a, adder 406 and storage element 410c mapping to second accumulator 206a, and adder 406 and storage element 410a mapping to third accumulator 205a. As such, an advantage of the triple accumulator 402a is that it shares one adder between first accumulator 204a, second accumulator 206a and third accumulator 205a with the drawback of introducing the additional components of multiplexors 404 and 408.

Figure 14:
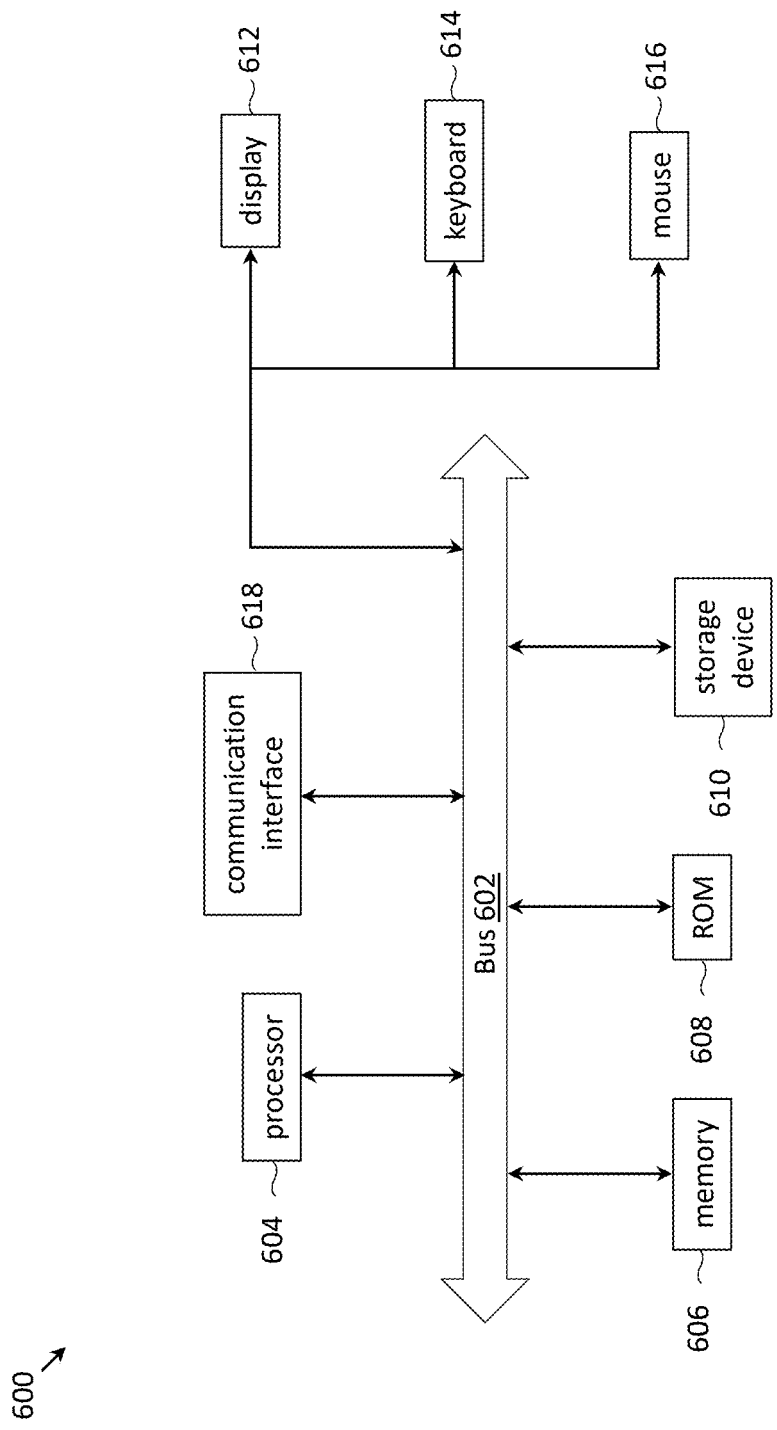
FIG. 14 depicts components of a computer system in which computer readable instructions instantiating the methods of the present invention may be stored and executed.

FIG. 14 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 14 provides an example of a system 600 that may be representative of any of the computing systems (e.g., controller 116, etc.) discussed herein. Note, not all of the various computer systems have all of the features of system 600. For example, certain ones of the computer systems discussed above may not include a display inasmuch as the display function may be provided by a client computer communicatively coupled to the computer system or a display function may be unnecessary. Such details are not critical to the present invention.

System 600 includes a bus 602 or other communication mechanism for communicating information, and a processor 604 coupled with the bus 602 for processing information. Computer system 600 also includes a main memory 606, such as a random access memory (RAM) or other dynamic storage device, coupled to the bus 602 for storing information and instructions to be executed by processor 604. Main memory 606 also may be used for storing temporary variables or other intermediate information during execution of instructions to be executed by processor 204. Computer system 600 further includes a read only memory (ROM) 608 or other static storage device coupled to the bus 602 for storing static information and instructions for processor 604. A storage device 610, for example a hard disk, flash memory-based storage medium, or other storage medium from which processor 604 can read, is provided and coupled to bus 602 for storing information and instructions (e.g., operating systems, applications programs and the like).

Computer system 600 may be coupled via bus 602 to display 612, such as a flat panel display, for displaying information to a computer user. An input device 614, such as a keyboard including alphanumeric and other keys, may be coupled to bus 602 for communicating information and command selections to processor 604. Another type of user input device is cursor control device 616, such as a mouse, a trackpad, or similar input device for communicating direction information and command selections to processor 604 and for controlling cursor movement on display 612. Other user interface devices, such as microphones, speakers, etc. are not shown in detail but may be involved with the receipt of user input and/or presentation of output.

The processes referred to herein may be implemented by processor 604 executing appropriate sequences of computer-readable instructions contained in main memory 606. Such instructions may be read into main memory 606 from another computer-readable medium, such as storage device 610, and execution of the sequences of instructions contained in main memory 606 causes processor 604 to perform the associated actions. In alternative embodiments, hard-wired circuitry or firmware-controlled processing units may be used in place of or in combination with processor 604 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 600 or similar electronic computing device, that manipulates and transforms data represented as physical (electronic) quantities within its registers and memories into other data similarly represented as physical quantities within its memories or registers or other such information storage, transmission or display devices.

Computer system 600 also includes communication interface 618 coupled to bus 602. Communication interface 618 may provide a two-way data communication channel with a computer network, which provides connectivity to and among the various computer systems discussed above. For example, communication interface 618 may be a local area network (LAN) card to provide a data communication connection to a compatible LAN, which itself is communicatively coupled to the Internet through one or more Internet service provider networks. The precise details of such communication paths are not critical to the present invention. What is important is that computer system 600 can send and receive messages and data through the communication interface 618 and in that way communicate with hosts accessible via the Internet.

Thus, a multiply accumulate (MAC) unit with a split accumulator has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A device, comprising:
   a multiplier configured to multiply a first value and a second value;
   an adder configured to sum a third value and a fourth value;
   a first accumulator configured to accumulate an output of the multiplier, the first accumulator comprising the adder and a first storage element communicatively coupled to an output of the adder and configured to store the output of the adder when the first accumulator is accumulating the output of the multiplier;
   a second accumulator configured to accumulate an output of the first accumulator, the second accumulator comprising the adder and a second storage element communicatively coupled to the output of the adder and configured to store the output of the adder when the second accumulator is accumulating the output of the first accumulator;
   a first multiplexor comprising a first input communicatively coupled to the output of the multiplier and a second input communicatively coupled to an output of the second accumulator, the first multiplexor configured to select either the first input or the second input; and
   a controller configured to control the first accumulator and the second accumulator so that at most one of the first or second accumulators is performing an accumulation operation at any moment in time.

2. The device of claim 1, wherein the third value is set equal to an output of the first multiplexor.

3. The device of claim 1, wherein the fourth value is set equal to the output of the first accumulator.

4. The device of claim 1, further comprising a memory element configured to store the output of the second accumulator.

5. The device of claim 1, wherein the device forms a multiply-accumulate (MAC) unit.

6. The device of claim 1, wherein the first multiplexor is configured to select the first input when the first accumulator is accumulating the output of the multiplier.

7. The device of claim 1, wherein the first multiplexor is configured to select the second input when the second accumulator is accumulating the output of the first accumulator.

8. The device of claim 1, further comprising:
   a third accumulator configured to accumulate the output of the second accumulator, the third accumulator comprising the adder and a third storage element communicatively coupled to the output of the adder and configured to store the output of the adder when the third accumulator is accumulating the output of the second accumulator; and
   a second multiplexor with a third input communicatively coupled to the output of the first accumulator and a fourth input communicatively coupled to an output of the third accumulator, the second multiplexor configured to select one of the third input or the fourth input,
   wherein the third value is set equal to an output of the first multiplexor, and
   wherein the fourth value is set equal to an output of the second multiplexor.

9. A method, comprising:
   multiplying, by a multiplier, a first value and a second value;
   summing, by an adder, a third value and a fourth value;

accumulating, by a first accumulator, an output of the multiplier, the first accumulator comprising the adder and a first storage element configured to store an output of the adder when the first accumulator is accumulating the output of the multiplier;

accumulating, by a second accumulator, an output of the first accumulator, the second accumulator comprising the adder and a second storage element configured to store the output of the adder when the second accumulator is accumulating the output of the first accumulator;

selecting, by a first multiplexor one of the output of the multiplier or an output of the second accumulator; and controlling, by a controller, the first accumulator and the second accumulator so that at most one of the first or second accumulators is performing an accumulation operation at any moment in time.

10. The method of claim 9, wherein for each of a plurality of time periods, the first accumulator is initialized before the first accumulator accumulates the output of the multiplier.

11. The method of claim 10, wherein initializing the first accumulator comprises setting the fourth value to zero.

12. The method of claim 10, wherein initializing the first accumulator comprises storing a zero value in the first storage element.

13. The method of claim 10, wherein the second accumulator is initialized before the second accumulator accumulates the output of the first accumulator.

14. The method of claim 13, wherein initializing the second accumulator comprises setting the third value to zero.

15. The method of claim 13, wherein initializing the second accumulator comprises storing a zero value in the second storage element.

16. The method of claim 13, wherein for each of the time periods, the output of the first accumulator is summed, by the adder, with the output of the second accumulator immediately prior to the first accumulator being initialized.

17. The method of claim 16, wherein the output of the first accumulator is summed, by the adder, with the output of the second accumulator after the output of the first accumulator exceeds a predetermined threshold.

18. The method of claim 13, wherein the output of the second accumulator is stored at a memory element immediately prior to the second accumulator being initialized.

19. The method of claim 18, wherein the output of the second accumulator is stored at the memory element while the first accumulator is accumulating the output of the multiplier.

* * * * *